United States Patent
Mabey et al.

(10) Patent No.: US 7,457,359 B2
(45) Date of Patent: Nov. 25, 2008

(54) SYSTEMS, DEVICES AND METHODS FOR SECURELY DISTRIBUTING HIGHLY-COMPRESSED MULTIMEDIA CONTENT

(76) Inventors: Danny L. Mabey, 947 N. Oakridge Dr., Farmington, UT (US) 84025; Lawrence S. Reznick, 4345 Morpheus La., Sacramento, CA (US) 95864; John E. Wilkinson, 3416 Lindi Ct., Carmichael, CA (US) 95608; Jack A. Prock, 897 Farley Ct., Folsom, CA (US) 95630; Jodie L. Reynolds, 13389 Folsom Blvd., #300-303, Folsom, CA (US) 95630; Robert W. Ingraham, 127 Honey Cook Cir., Folsom, CA (US) 95630

( * ) Notice: Subject to any disclaimer, the term of this patent is extended or adjusted under 35 U.S.C. 154(b) by 1021 days.

(21) Appl. No.: 10/825,711

(22) Filed: Apr. 16, 2004
(Under 37 CFR 1.47)

(65) Prior Publication Data
US 2005/0018768 A1 Jan. 27, 2005

Related U.S. Application Data

(63) Continuation-in-part of application No. 10/256,866, filed on Sep. 26, 2002, now Pat. No. 7,295,608, application No. 10/825,711, and a continuation-in-part of application No. 10/784,397, filed on Feb. 23, 2004, now Pat. No. 7,302,102, which is a continuation-in-part of application No. 10/692,106, filed on Oct. 23, 2003.

(60) Provisional application No. 60/325,483, filed on Sep. 26, 2001.

(51) Int. Cl.
*H04N 7/12* (2006.01)
(52) U.S. Cl. .............. 375/240.01; 375/240; 375/240.12
(58) Field of Classification Search ................. 375/240, 375/240.01, 240.12, 240.14; 370/252
See application file for complete search history.

(56) References Cited

U.S. PATENT DOCUMENTS 5,481,297 A * 1/1996 Cash et al. ............... 348/14.12
5,517,246 A 5/1996 Suzuki (Continued)

FOREIGN PATENT DOCUMENTS

WO 9918728 A1 4/1999

(Continued)

OTHER PUBLICATIONS

Ostman, Charles; Sentience on Demand, as an Online Commodity; 1997, 1998; www.biota.org/ostman/sent1.htm; pp. 1-11.

*Primary Examiner*—Allen Wong
(74) *Attorney, Agent, or Firm*—Kory D. Christensen; Stoel Rives LLP

(57) ABSTRACT

A multimedia distribution device includes a nonvolatile memory that stores a compressed media signal in which at least two scenes are selectively compressed using different codecs from a codec library, the codecs being automatically selected to produce a highest compression quality for the respective scenes according to a set of criteria without exceeding a target data rate. The nonvolatile memory also stores a plurality of codec indicators specifying which codecs from the codec library were used to respectively compress each scene within the compressed media signal.

20 Claims, 19 Drawing Sheets

U.S. PATENT DOCUMENTS

| | | | |
|---|---|---|---|
| 5,539,908 A | 7/1996 | Chen et al. | 395/700 |
| 5,596,659 A * | 1/1997 | Normile et al. | 382/253 |
| 5,649,030 A * | 7/1997 | Normile et al. | 382/253 |
| 5,684,714 A * | 11/1997 | Yogeshwar et al. | 370/521 |
| 5,822,465 A * | 10/1998 | Normile et al. | 382/253 |
| 6,002,720 A | 12/1999 | Yurt et al. | |
| 6,031,939 A | 2/2000 | Gilbert et al. | |
| 6,085,236 A | 7/2000 | Lea | 709/220 |
| 6,115,755 A | 9/2000 | Krishan | 709/250 |
| 6,157,965 A | 12/2000 | Mohammed et al. | 710/8 |
| 6,195,692 B1 | 2/2001 | Hsu | 709/219 |
| 6,212,302 B1 * | 4/2001 | Honsinger et al. | 382/232 |
| 6,243,676 B1 | 6/2001 | Witteman | 704/243 |
| 6,252,544 B1 | 6/2001 | Hoffberg | 342/357.1 |
| 6,349,151 B1 * | 2/2002 | Jones et al. | 382/251 |
| 6,356,545 B1 | 3/2002 | Vargo et al. | |
| 6,356,589 B1 * | 3/2002 | Gebler et al. | 375/240.1 |
| 6,356,668 B1 * | 3/2002 | Honsinger et al. | 382/251 |
| 6,421,726 B1 | 7/2002 | Kenner et al. | 709/225 |
| 6,587,638 B1 * | 7/2003 | Watanabe et al. | 386/94 |
| 6,624,761 B2 | 9/2003 | Fallon | 341/51 |
| 6,754,181 B1 * | 6/2004 | Elliott et al. | 370/252 |
| 6,968,006 B1 | 11/2005 | Puri et al. | |
| 7,130,472 B2 * | 10/2006 | Iizuka et al. | 382/236 |
| 2002/0062482 A1 | 5/2002 | Bolle et al. | |
| 2002/0097917 A1 | 7/2002 | Nelson et al. | |
| 2003/0133501 A1 | 7/2003 | Ueda et al. | |

FOREIGN PATENT DOCUMENTS

| | | |
|---|---|---|
| WO | 02087255 A1 | 10/2002 |

* cited by examiner

SYSTEMS, DEVICES AND METHODS FOR SECURELY DISTRIBUTING HIGHLY-COMPRESSED MULTIMEDIA CONTENT

CROSS-REFERENCE TO RELATED APPLICATIONS

This application is a continuation-in-part of U.S. patent application Ser. No. 10/256,866, filed Sep. 26, 2002, now U.S. Pat. No. 7,295,608 which claims the benefit of Provisional Application No. 60/325,483, filed Sep. 26, 2001, both of which are incorporated herein by reference. This application is also a continuation-in-part of U.S. patent application Ser. No. 10/692,106, filed Oct. 23, 2003, and U.S. patent application Ser. No. 10/784,397, filed Feb. 23, 2004, now U.S. Pat. No. 7,302,102 both of which are likewise incorporated herein by reference.

TECHNICAL FIELD

The present invention relates generally to the field of data compression. More specifically, the present invention relates to techniques for optimizing the compression of video and audio signals.

BACKGROUND OF THE INVENTION

In the communication age, bandwidth is money. Video and audio signals (hereinafter "media signals") consume enormous amounts of bandwidth depending on the desired transmission quality. As a result, data compression is playing an increasingly important role in communication.

Conventionally, the parties to a communication decide on a particular codec (compressor/decompressor) for compressing and decompressing media signals. A wide variety of codecs are available. General classifications of codecs include discrete cosine transfer (DCT) or "block" codecs, fractal codecs, and wavelet codecs.

Some codecs are "lossless," meaning that no data is lost during the compression process. A compressed media signal, after being received and decompressed by a lossless codec, is identical to the original. However, most commercially-available codecs are "lossy" and result in some degradation of the original media signal.

For lossy codecs, compression "quality" (i.e., how similar a compressed media signal is to the original after decompression) varies substantially from codec to codec, and may depend, for instance, on the amount of available bandwidth, the quality of the communication line, characteristics of the media signal, etc. Another compression metric, i.e., performance, relates to the amount of bandwidth required to transmit the compressed signal as opposed to the original signal. Typically, lossy codecs result in better performance than lossless codecs, which is why they are preferred in most applications.

Codec designers generally attempt to fashion codecs that produce high quality compressed output across a wide range of operating parameters. Although some codecs, such as MPEG-2, have gained widespread acceptance because of their general usefulness, no codec is ideally suited to all purposes. Each codec has individual strengths and weaknesses.

Conventionally, the same codec is used to compress and decompress a media signal during the entire communication session or uniformly across a storage medium (e.g., DVD). However, a media signal is not a static quantity. A video signal, for example, may change substantially from scene to scene. Likewise, the available bandwidth or line quality may change during the course of a communication. Selecting the wrong codec at the outset can be a costly mistake in terms of the bandwidth required to transmit or store the media signal.

Another problem arises from the selection of various codec settings, which typically apply throughout the communication session. Because the codec settings affect the "quality" of the transmission, i.e., how similar a received and decompressed signal is to the original, such settings are often referred to as quality settings.

In general, quality settings affect the amount of bandwidth required for the transmission. Higher quality settings typically consume greater bandwidth, while lower quality settings require lesser bandwidth.

Unfortunately, the bandwidth required for sending each frame of a media signal is variable, as is the overall amount of available bandwidth. Using a single set of quality settings throughout a transmission does not take into account this variability, and the result is video "jerkiness" (frame loss), audio degradation, and the like, when there is insufficient bandwidth to represent a frame at a given moment in time. Anyone who has participated in a videoconferencing session has experienced the uneven quality of conventional approaches.

DETAILED DESCRIPTION

Figure 1:
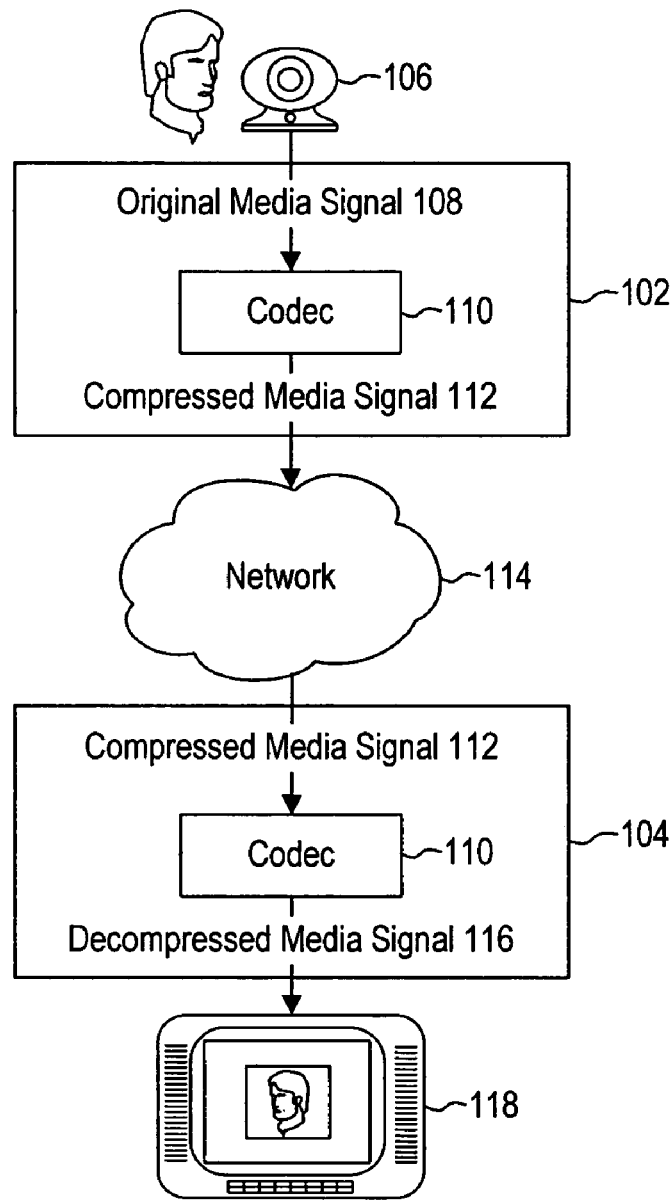
FIG. 1 is a block diagram of a conventional communication system using data compression.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

FIG. 1 is a block diagram of a conventional system 100 for communicating media signals from a source system 102 to a destination system 104. The source and destination systems 102, 104 may be variously embodied, for example, as personal computers (PCs), cable or satellite set-top boxes (STBs), or video-enabled portable devices, such as personal digital assistants (PDAs) or cellular telephones.

Within the source system 102, a video camera 106 or other device captures an original media signal 108. A codec (compressor/decompressor) 110 processes the original media signal 108 to create a compressed media signal 112, which may be delivered to the destination system 104 via a network 114, such as a local area network (LAN) or the Internet. Alternatively, the compressed media signal 112 could be written to a storage medium, such as a CD, DVD, flash memory device, or the like.

At the destination system 104, the same codec 110 processes the compressed media signal 112 received through the network 114 to generate a decompressed media signal 116. The destination system 104 then presents the decompressed media signal 116 on a display device 118, such as a television or computer monitor.

Conventionally, the source system 102 uses a single codec 110 to process the entire media signal 108 during a communication session or for a particular storage medium. However, as noted above, a media signal is not a static quantity. Video signals may change substantially from scene to scene. A single codec, which may function well under certain conditions, may not fare so well under different conditions. Changes in available bandwidth, line conditions, or characteristics of the media signal, itself, may drastically change the compression quality to the point that a different codec may do much better. In certain cases, a content developer may be able to manually specify a change of codec 110 within a media signal 108 where, for instance, the content developer knows that one codec 110 may be superior to another codec 110. However, this requires significant human effort and cannot be performed in real time.

Figure 2:
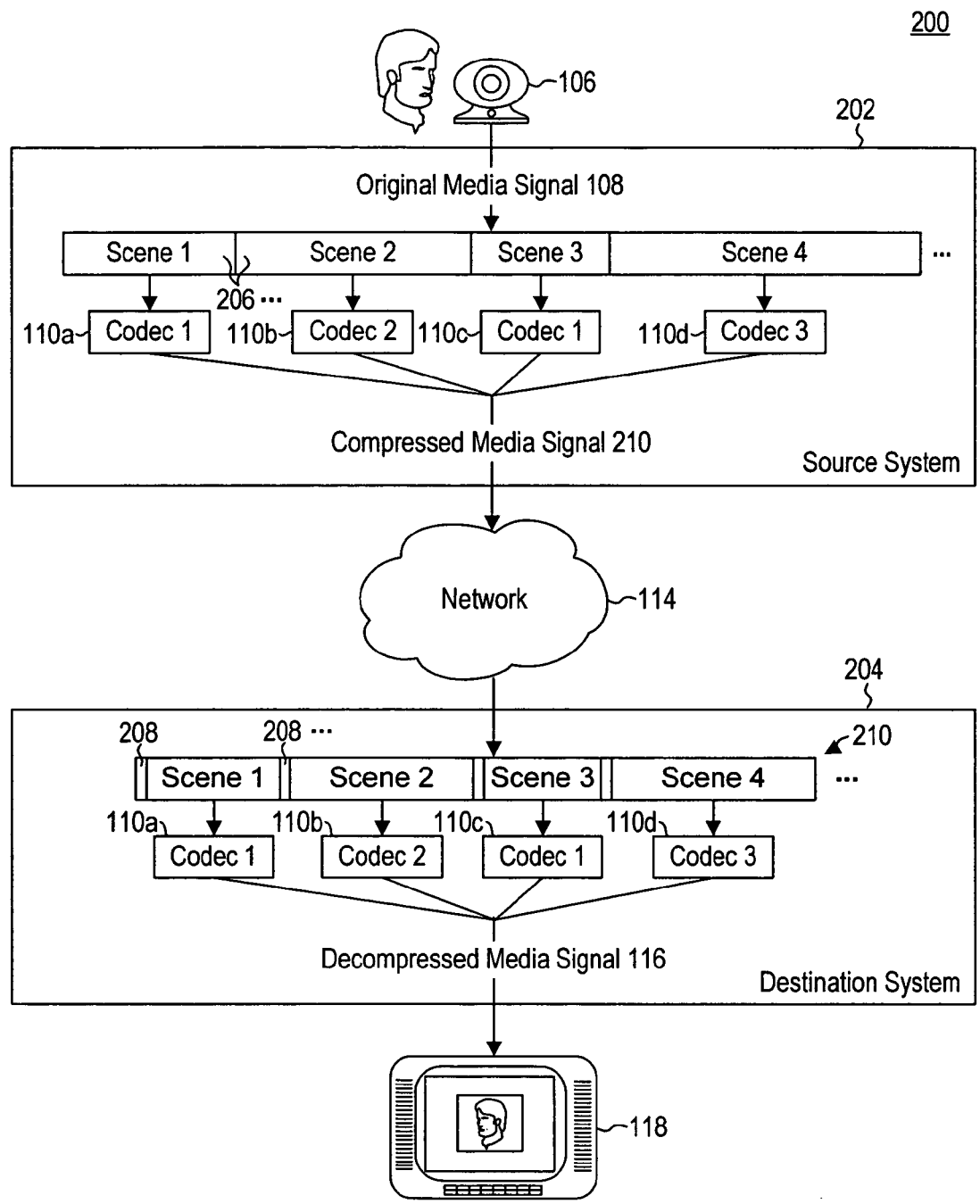
FIG. 2 is a block diagram of a communication system using multiple codecs for compressing portions of a media signal according to an embodiment of the invention.

FIG. 2 is a block diagram of an alternative system 200 for communicating media signals from a source system 202 to a destination system 204 according to an embodiment of the present invention. As before, the source system 202 receives an original media signal 108 captured by a video camera 106 or other suitable device.

However, unlike the system 100 of FIG. 1, the depicted system 200 is not limited to using a single codec 110 during a communication session or for a particular storage medium. Rather, as described in greater detail below, each scene 206 or segment of the original media signal 108 may be compressed using one of a plurality of codecs 110. A scene 206 may include one or more frames of the original media signal 108. In the case of video signals, a frame refers to a single image in a sequence of images. More generally, however, a frame refers to a packet of information used for communication.

As used herein, a scene 206 may correspond to a fixed segment of the media signal 108, e.g., two seconds of audio/video or a fixed number of frames. In other embodiments, however, a scene 206 may be defined by characteristics of the original media signal 108, i.e., a scene 206 may include two or more frames sharing similar characteristics. When one or more characteristics of the original media signal 108 changes beyond a preset threshold, the source system 202 may detect the beginning of a new scene 206. Thus, while the video camera 106 focuses on a static object, a scene 206 may last until the camera 106, the object, or both are moved.

As illustrated, two adjacent scenes 206 within the same media signal 108 may be compressed using different codecs 110. The codecs 110 may be of the same general type, e.g., discrete cosine transform (DCT), or of different types. For example, one codec 110a may be a DCT codec, while another codec 110b is a fractal codec, and yet another codec 110c is a wavelet codec.

Unlike conventional systems 100, the system 200 of FIG. 2 automatically selects, from the available codecs 110, a particular codec 110 best suited to compressing each scene 206. Details of the selection process are described in greater detail below. Briefly, however, the system 200 "remembers" which codecs 110 are used for scenes 206 having particular characteristics. If a subsequent scene 206 is determined to have the same characteristics, the same codec 110 is used. However, if a scene 206 is found to have substantially different characteristics from those previously observed, the system 200 tests various codecs 110 on the scene 206 and selects the codec 110 producing the highest compression quality (i.e., how similar the compressed media signal 210 is to the original signal 108 after decompression) for a particular target data rate.

In addition, the source system 202 reports to the destination system 204 which codec 110 was used to compress each scene 206. As illustrated, this may be accomplished by associating codec identifiers 208 with each scene 206 in the resulting compressed media signal 210. The codec identifiers 208 may precede each scene 206, as shown, or could be sent as a block at some point during the transmission. The precise format of the codec identifiers 208 is not crucial to the invention and may be implemented using standard data structures known to those of skill in the art.

The destination system 204 uses the codec identifiers 208 to select the appropriate codecs 110 for decompressing the respective scenes 206. The resulting decompressed media signal 116 may then be presented on the display device 118, as previously described.

Figure 3:
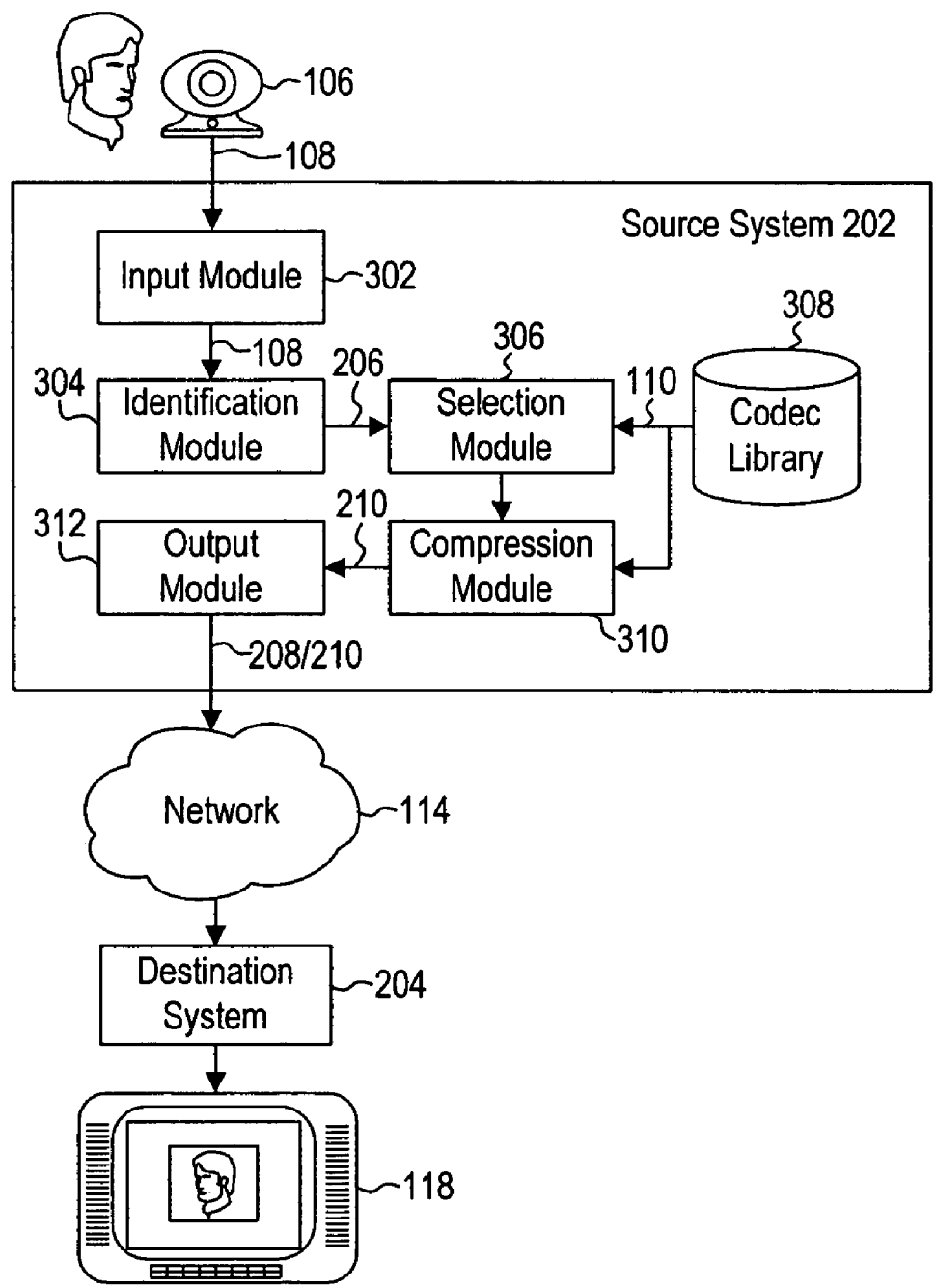
FIG. 3 is a detailed block diagram of a source system according to a first embodiment of the invention.

FIG. 3 illustrates additional details of the source system 202. In one embodiment, an input module 302 receives the original media signal 108 from the video camera 106 or other source device. An identification module 304 divides the original media signal 108 into scenes 206 and identifies various characteristics (not shown) of each scene 206, as described in greater detail below.

Thereafter, for each scene 206, a selection module 306 uses the characteristics (or the scene 206 itself) to select the optimal codec 110 from a codec library 308. As used herein, "optimal" means producing the highest compression quality for the compressed media signal 210 at a particular target data rate (among those codecs 110 within the codec library 308).

In one embodiment, a user may specify a particular target data rate, i.e., 128 kilobits per second (kbps). Alternatively, the target data rate may be determined by the available bandwidth or in light of other constraints.

The codec library 308 may include a wide variety of codecs 110. Examples of possible video codecs 110 are provided in the following table. In addition, various audio-only codecs may be provided, such as MPEG Audio Layer 3 (MP3), MPEG4 Structured Audio (MP4-SA), CCITT u-Law, Ogg Vorbis, and AC3. Of course, other presently-available or yet-to-be-developed codecs 110 may be used within the scope of the invention.

TABLE 1

| FOURCC | Name | Owner |
|---|---|---|
| 3IV1 | 3ivx | 3IVX |
| 3IV2 | 3ivx | 3IVX |
| AASC | Autodesk Animator codec | Autodesk |
| ADV1 | WaveCodec | Loronix |
| ADVJ | Avid M-JPEG | Avid Technology |
| AEMI | Array VideoONE MPEG1-I Capture | Array Microsystems |
| AFLI | Autodesk Animator codec | Autodesk |
| AFLC | Autodesk Animator codec | Autodesk |
| AMPG | Array VideoONE MPEG | Array Microsystems |
| ANIM | RDX | Intel |
| AP41 | AngelPotion Definitive | AngelPotion |
| ASV1 | Asus Video | Asus |
| ASV2 | Asus Video (2) | Asus |
| ASVX | Asus Video 2.0 | Asus |
| AUR2 | Aura 2 Codec - YUV 422 | Auravision |
| AURA | Aura 1 Codec - YUV 411 | Auravision |
| AVRn | Avid M-JPEG | Avid Technology |
| BINK | Bink Video | RAD Game Tools |
| BT20 | Prosumer Video | Conexant |
| BTCV | Composite Video Codec | Conexant |
| BW10 | Broadway MPEG Capture/Compression | Data Translation |
| CC12 | YUV12 Codec | Intel |
| CDVC | Canopus DV Codec | Canopus |
| CFCC | DPS Perception | Digital Processing Systems |
| CGDI | Camcorder Video | Microsoft |
| CHAM | Caviara Champagne | Winnov |
| CMYK | Uncompressed CMYK | Colorgraph |
| CJPG | WebCam JPEG | Creative Labs |
| CPLA | YUV 4:2:0 | Weitek |
| CRAM | Microsoft Video 1 | Microsoft |
| CVID | Cinepak | Providenza & Boekelheide |
| CWLT | Color WLT DIB | Microsoft |
| CYUV | Creative YUV | Creative Labs |
| CYUY | | ATI Technologies |
| D261 | H.261 | DEC |
| D263 | H.263 | DEC |
| DIV3 | DivX MPEG-4 | DivX |
| DIV4 | DivX MPEG-4 | DivX |
| DIV5 | DivX MPEG-4 | DivX |
| DIVX | DivX | OpenDivX |
| divx | DivX | |
| DMB1 | Rainbow Runner hardware compression | Matrox |
| DMB2 | Rainbow Runner hardware compression | Matrox |
| DSVD | DV Codec | |
| DUCK | TrueMotion S | Duck Corporation |
| dv25 | DVCPRO | Matrox |
| dv50 | DVCPRO50 | Matrox |
| dvsd | | Pinnacle Systems |
| DVE2 | DVE-2 Videoconferencing Codec | InSoft |
| DVX1 | DVX1000SP Video Decoder | Lucent |
| DVX2 | DVX2000S Video Decoder | Lucent |
| DVX3 | DVX3000S Video Decoder | Lucent |
| DX50 | DivX MPEG-4 version 5 | DivX |
| DXTn | DirectX Compressed Texture | Microsoft |
| DXTC | DirectX Texture Compression | Microsoft |
| ELK0 | Elsa Quick Codec | Elsa |
| EKQ0 | Elsa Quick Codec | Elsa |
| ESCP | Escape | Eidos Technologies |
| ETV1 | eTreppid Video Codec | eTreppid Technologies |
| ETV2 | eTreppid Video Codec | eTreppid Technologies |
| ETVC | eTreppid Video Codec | eTreppid Technologies |
| FLJP | Field Encoded Motion JPEG | D-Vision |
| FRWA | Forward Motion JPEG with alpha channel | SoftLab-Nsk |
| FRWD | Forward Motion JPEG | SoftLab-Nsk |
| FVF1 | Fractal Video Frame | Iterated Systems |
| GLZW | Motion LZW | gabest@freemail.hu |
| GPEG | Motion JPEG | gabest@freemail.hu |
| GWLT | Greyscale WLT DIB | Microsoft |
| H260 through H269 | ITU H.26n | Intel |
| HFYU | Huffman Lossless Codec | |
| HMCR | Rendition Motion Compensation Format | Rendition |
| HMRR | Rendition Motion Compensation Format | Rendition |
| i263 | ITU H.263 | Intel |
| IAN | Indeo 4 Codec | Intel |
| ICLB | CellB Videoconferencing Codec | InSoft |
| IGOR | Power DVD | |
| IJPG | Intergraph JPEG | Intergraph |
| ILVC | Layered Video | Intel |
| ILVR | ITU H.263+ Codec | |
| IPDV | Giga AVI DV Codec | I-O Data Device, Inc. |
| IR21 | Indeo 2.1 | Intel |
| IRAW | Intel Uncompressed UYUV | Intel |
| IV30 through IV39 | Indeo 3 | Ligos |
| IV32 | Indeo 3.2 | Ligos |
| IV40 through IV49 | Indeo Interactive | Ligos |
| IV50 | Indeo Interactive | Ligos |
| JBYR | | Kensington |
| JPEG | JPEG Still Image | Microsoft |
| JPGL | JPEG Light | |
| L261 | Lead H.26 | Lead Technologies |
| L263 | Lead H.263 | Lead Technologies |
| LCMW | Motion CMW Codec | Lead Technologies |

TABLE 1-continued

| FOURCC | Name | Owner |
|---|---|---|
| LEAD | LEAD Video Codec | Lead Technologies |
| LGRY | Grayscale Image | Lead Technologies |
| Ljpg | LEAD MJPEG Codec | Lead Technologies |
| LZO1 | Lempel-Ziv-Oberhumer Codec | Markus Oberhumer |
| M263 | H.263 | Microsoft |
| M261 | H.261 | Microsoft |
| M4S2 | MPEG-4 (automatic WMP download) | Microsoft |
| MC12 | Motion Compensation Format | ATI Technologies |
| MCAM | Motion Compensation Format | ATI Technologies |
| MJ2C | Motion JPEG 2000 | Morgan Multimedia |
| mJPG | Motion JPEG including Huffman Tables | IBM |
| MJPG | Motion JPEG | |
| MMES | MPEG-2 ES | Matrox |
| MP2A | Eval download | Media Excel |
| MP2T | Eval download | Media Excel |
| MP2V | Eval download | Media Excel |
| MP42 | MPEG-4 (automatic WMP download) | Microsoft |
| MP43 | MPEG-4 (automatic WMP download) | Microsoft |
| MP4A | Eval download | Media Excel |
| MP4S | MPEG-4 (automatic WMP download) | Microsoft |
| MP4T | Eval download | Media Excel |
| MP4V | Eval download | Media Excel |
| MPEG | MPEG | |
| MPG4 | MPEG-4 (automatic WMP download) | Microsoft |
| MPG4 | MPEG-4 | Microsoft |
| MPGI | MPEG | Sigma Designs |
| MRCA | Mrcodec | FAST Multimedia |
| MRLE | Microsoft RLE | Microsoft |
| MSVC | Microsoft Video 1 | Microsoft |
| MSZH | AVImszh | Kenji Oshima |
| MTX1 through MTX9 | | Matrox |
| MV12 | | |
| MWV1 | Aware Motion Wavelets | Aware Inc. |
| nAVI | | |
| NTN1 | Video Compression 1 | Nogatech |
| NVDS | NVidia Texture Format | NVidia |
| NVHS | NVidia Texture Format | NVidia |
| NHVU | NVidia Texture Format | NVidia |
| NVS0-NVS5 | | NVidia |
| NVT0-NVT5 | | NVidia |
| PDVC | DVC codec | I-O Data Device, Inc. |
| PGVV | Radius Video Vision | Radius |
| PHMO | Photomotion | IBM |
| PIM1 | | Pegasus Imaging |

TABLE 1-continued

| FOURCC | Name | Owner |
|---|---|---|
| PIM2 | | Pegasus Imaging |
| PIMJ | Lossless JPEG | Pegasus Imaging |
| PIXL | Video XL | Pinnacle Systems |
| PVEZ | PowerEZ | Horizons Technology |
| PVMM | PacketVideo Corporation MPEG-4 | PacketVideo Corporation |
| PVW2 | Pegasus Wavelet Compression | Pegasus Imaging |
| qpeq | QPEG 1.1 | Q-Team |
| QPEG | QPEG | Q-Team |
| raw | Raw RGB | |
| RGBT | 32 bit support | Computer Concepts |
| RLE | Run Length Encoder | Microsoft |
| RLE4 | 4 bpp Run Length Encoder | Microsoft |
| RLE8 | 8 bpp Run Length Encoder | Microsoft |
| RMP4 | MPEG-4 AS Profile Codec | Sigma Designs |
| RT21 | Real Time Video 2.1 | Intel |
| rv20 | RealVideo G2 | Real |
| rv30 | RealVideo 8 | Real |
| RVX | RDX | Intel |
| s422 | VideoCap C210 YUV Codec | Tekram International |
| SAN3 | DivX 3 | |
| SDCC | Digital Camera Codec | Sun Communications |
| SEDG | Samsung MPEG-4 | Samsung |
| SFMC | Surface Fitting Method | CrystalNet |
| SMSC | Proprietary codec | Radius |
| SMSD | Proprietary codec | Radius |
| smsv | Wavelet Video | WorldConnect (corporate site) |
| SP54 | | SunPlus |
| SPIG | Spigot | Radius |
| SQZ2 | VXTreme Video Codec V2 | Microsoft |
| SV10 | Video R1 | Sorenson Media |
| STVA | ST CMOS Imager Data | ST Microelectronics |
| STVB | ST CMOS Imager Data | ST Microelectronics |
| STVC | ST CMOS Imager Data (Bunched) | ST Microelectronics |
| STVX | ST CMOS Imager Data | ST Microelectronics |
| STVY | ST CMOS Imager Data | ST Microelectronics |
| SVQ1 | Sorenson Video | Sorenson Media |
| TLMS | Motion Intraframe Codec | TeraLogic |
| TLST | Motion Intraframe Codec | TeraLogic |
| TM20 | TrueMotion 2.0 | Duck Corporation |
| TM2X | TrueMotion 2X | Duck Corporation |

TABLE 1-continued

| FOURCC | Name | Owner |
|---|---|---|
| TMIC | Motion Intraframe Codec | TeraLogic |
| TMOT | TrueMotion S | Horizons Technology |
| TR20 | TrueMotion RT 2.0 | Duck Corporation |
| TSCC | TechSmith Screen Capture Codec | Techsmith Corp. |
| TV10 | Tecomac Low-Bit Rate Codec | Tecomac, Inc. |
| TVJP | | Pinnacle/Truevision |
| TVMJ | | Pinnacle/Truevision |
| TY2C | Trident Decompression | Trident Microsystems |
| TY2N | | Trident Microsystems |
| TY0N | | Trident Microsystems |
| UCOD | ClearVideo | eMajix.com |
| ULTI | Ultimotion | IBM Corp. |
| V261 | Lucent VX2000S | Lucent |
| V655 | YUV 4:2:2 | Vitec Multimedia |
| VCR1 | ATI Video Codec 1 | ATI Technologies |
| VCR2 | ATI Video Codec 2 | ATI Technologies |
| VCR3-9 | ATI Video Codecs | ATI Technologies |
| VDCT | VideoMaker Pro DIB | Vitec Multimedia |
| VDOM | VDOWave | VDONet |
| VDOW | VDOLive | VDONet |
| VDTZ | VideoTizer YUV Codec | Darim Vision Co. |
| VGPX | VideoGramPix | Alaris |
| VIFP | VFAPI Codec | |
| VIDS | | Vitec Multimedia |
| VIVO | Vivo H.263 | Vivo Software |
| VIXL | Video XL | Pinnacle Systems |
| VLV1 | | VideoLogic |
| VP30 | VP3 | On2 |
| VP31 | VP3 | On2 |
| vssv | VSS Video | Vanguard Software Solutions |
| VX1K | VX1000S Video Codec | Lucent |
| VX2K | VX2000S Video Codec | Lucent |
| VXSP | VX1000SP Video Codec | Lucent |
| VYU9 | ATI YUV | ATI Technologies |
| VYUY | ATI YUV | ATI Technologies |
| WBVC | W9960 | Winbond Electronics |
| WHAM | Microsoft Video 1 | Microsoft |
| WINX | Winnov Software Compression | Winnov |
| WJPG | Winbond JPEG | |
| WNV1 | Winnov Hardware Compression | Winnov |
| x263 | | Xirlink |
| XVID | XVID MPEG-4 | XVID |
| XLV0 | XL Video Decoder | NetXL Inc. |
| XMPG | XING MPEG | XING Corporation |
| XWV0-XWV9 | XiWave Video Codec | XiWave |
| XXAN | | Origin |
| Y411 | YUV 4:1:1 | Microsoft |
| Y41P | Brooktree YUV 4:1:1 | Conexant |
| Y8 | Grayscale video | |
| YC12 | YUV 12 codec | Intel |
| YUV8 | Caviar YUV8 | Winnov |
| YUY2 | Raw, uncompressed YUV 4:2:2 | Microsoft |
| YUYV | | Canopus |
| ZLIB | | |
| ZPEG | Video Zipper | Metheus |
| ZyGo | ZyGoVideo | ZyGo Digital |

Those of skill in the art will recognize that many of the above-described codecs may be deemed "generalist" codecs in that they achieve a high compression quality for a wide variety of media signals and conditions. However, other codecs may be deemed "specialist" codecs because they compress certain types of media signals well or compress many types of media signals well under certain conditions. Providing a codec library 308 that includes a variety of both generalist and specialist codecs, including codecs of different families, typically results in the best overall compression quality for a compressed media signal 210.

Referring again to FIG. 3, after a codec 110 is selected for a scene 206, a compression module 310 compresses the scene 206 using the selected codec 110. An output module 312 receives the resulting compressed media signal 210 and, in one embodiment, adds codec identifiers 208 to indicate which codecs 110 were used to compress each scene 206. In other embodiments, the codec identifiers 208 may be added by the compression module 310 or at other points in the compression process. The output module 312 then delivers the compressed media signal 210 to the destination system 204 via the network 114.

Figure 4:
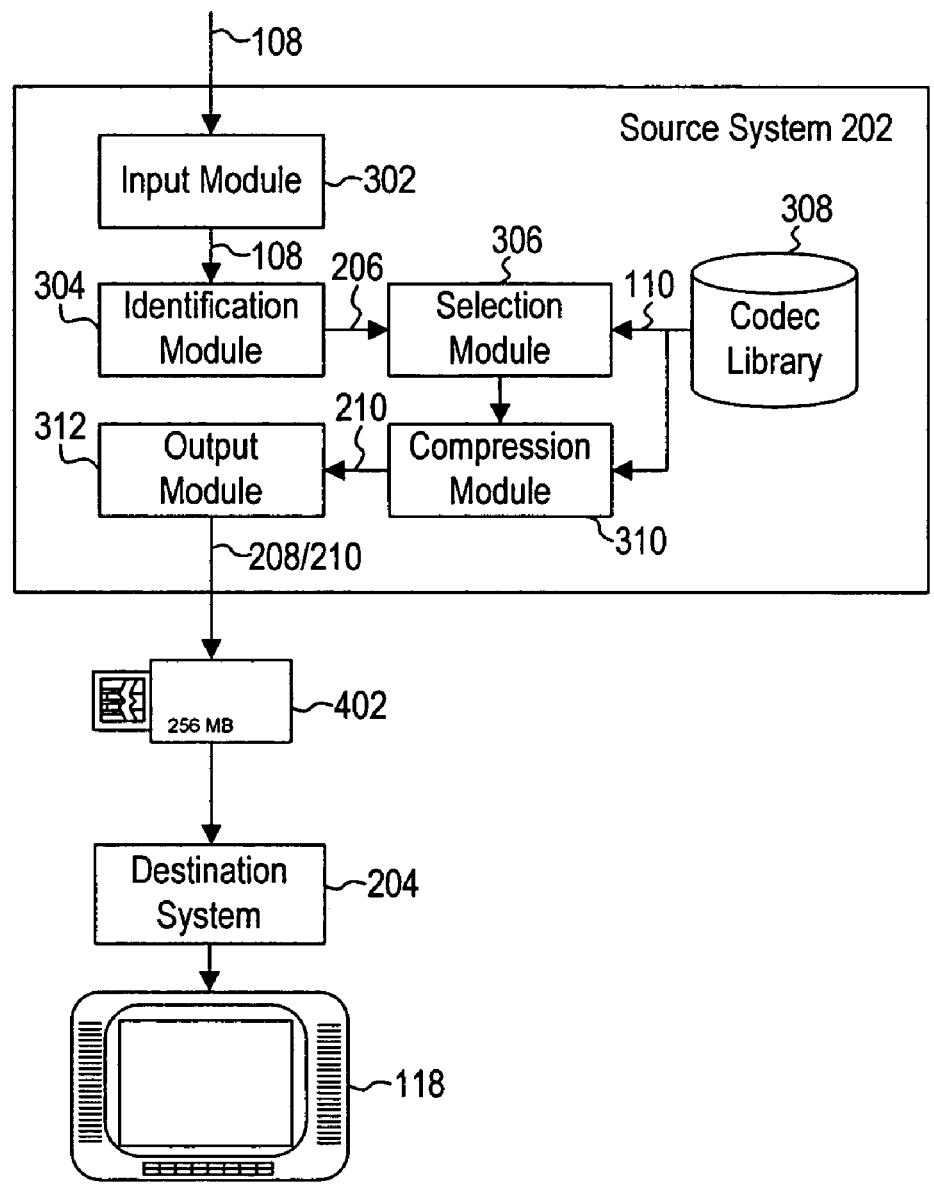
FIG. 4 is a detailed block diagram of a source system according to a second embodiment of the invention.

The embodiment of FIG. 3 is primarily applicable to streaming media applications, including video conferencing. In an alternative embodiment, as depicted in FIG. 4, the output module 312 may store the compressed media signal 210 (with codec identifiers 208) on a multimedia distribution device 402, such USB stick, flash memory card, etc., which can physically delivered to the destination system 204. In such an embodiment, the destination system 204 would include a media reader (not shown) for reading the compressed media signal 210 from the multimedia distribution device 402. In other embodiments, the output module 312 may be coupled to a media writer (not shown), to write the compressed media signal 210 to a storage medium, such as a recordable CD or DVD.

Unlike conventional media compression techniques, the original media signal 108 is not compressed using a single codec (i.e., MPEG-2 as in DVDs). Rather, each scene 206 is automatically compressed using the best codec 110 selected from a codec library 308 for that scene 206. Using the above-described technique, between 10 to 12 hours of DVD-quality video may be stored on a single recordable DVD. Similarly, an entire DVD-quality movie may be stored, in one embodiment, on a 256 MB memory stick.

Figure 5:
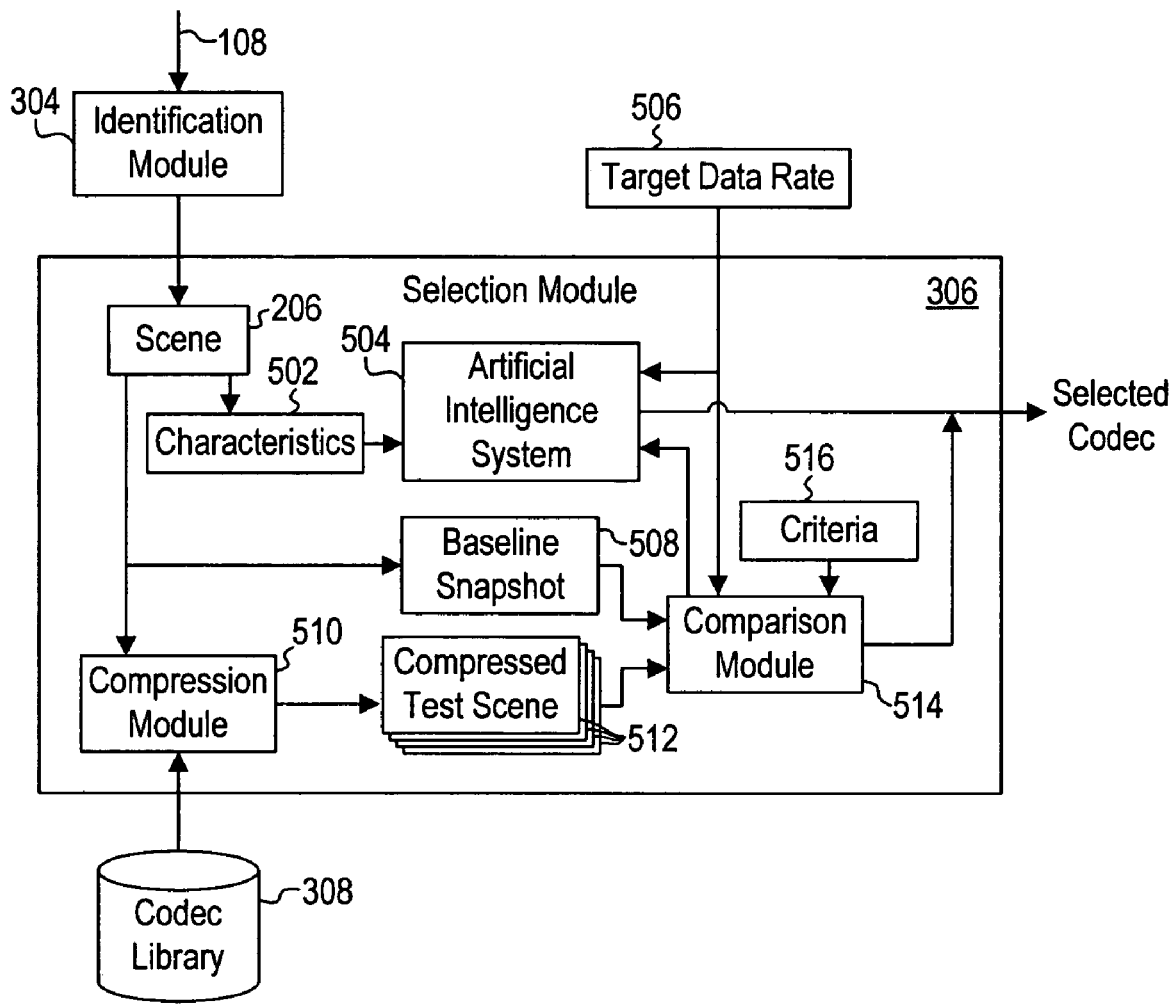
FIG. 5 is a detailed block diagram of a selection module.

FIG. 5 illustrates additional details of the selection module 306. As noted above, the identification module 304 receives the original media signal 108 and identifies individual scenes 206, as well as characteristics 502 of each scene 206. The characteristics 502 may include, for instance, motion characteristics, color characteristics, YUV signal characteristics, color grouping characteristics, color dithering characteristics, color shifting characteristics, lighting characteristics, and contrast characteristics. Those of skill in the art will recognize that a wide variety of other characteristics of a scene 206 may be identified within the scope of the invention.

Motion is composed of vectors resulting from object detection. Relevant motion characteristics may include, for example, the number of objects, the size of the objects, the speed of the objects, and the direction of motion of the objects.

With respect to color, each pixel typically has a range of values for red, green, blue, and intensity. Relevant color characteristics may include how the ranges of values change through the frame set, whether some colors occur more frequently than other colors (selection), whether some color groupings shift within the frame set, whether differences between one grouping and another vary greatly across the frame set (contrast).

In one embodiment, an artificial intelligence (AI) system 504, such as a neural network or expert system, receives the characteristics 502 of the scene 206, as well as a target data rate 506 for the compressed media signal 210. The AI system 504 then determines whether a codec 110 exists in the library 308 that has previously been found to optimally compress a scene 206 with the given characteristics 502 at the target data rate 506. As explained below, the AI system 504 may be conceptualized as "storing" associations between sets of characteristics 502 and optimal codecs 110. If an association is found, the selection module 306 outputs the codec 110 (or an indication thereof) as the "selected" codec 110.

In many cases, a scene 206 having the specified characteristics 502 may not have been previously encountered. Accordingly, the selection module 306 makes a copy of the scene 206, referred to herein as a baseline snapshot 508, which serves as a reference point for determining compression quality.

Thereafter, a compression module 510 tests different codecs 110 from the codec library 308 on the scene 206. In one embodiment, the compression module 510 is also the compression module 310 of FIG. 3. As depicted, the compression module 510 compresses the scene 206 using different codecs 110 at the target data rate 506 to produce multiple compressed test scenes 512.

The codecs 110 may be tested sequentially, at random, or in other ways, and all of the codecs 110 in the library need not be tested. In one embodiment, input from the AI system 504 may assist with selecting a subset of the codecs 110 from the library 308 for testing. In some cases, a time limit may be imposed for codec testing in order to facilitate real-time compression. Thus, when the time limit is reached, no additional compressed test scenes 512 are generated.

In one embodiment, a comparison module 514 compares the compression quality of each compressed test scene 512 with the baseline snapshot 508 according to a set of criteria 516. The criteria 516 may be based on a comparison of Peak Signal to Noise Ratios (PSNRs), which may be calculated, for an M×N frame, by:

$$PSNR = 20 \times \log_{10}\left(\frac{255}{\sqrt{\frac{1}{M \times N}\sum_{m=0}^{M-1}\sum_{n=0}^{N-1}[f'(m,n) - f(m,n)]^2}}\right) \quad \text{Eq. 1}$$

where f is the original frame and f' is the uncompressed frame. Alternatively, Root Mean Square Error (RMSE), Signal to Noise Ratio (SNR), or other objective quality metrics may be used as known to those of skill in the art.

In certain embodiments, a Just Noticeable Difference (JND) image quality metric calculation may be used. JND is a robust objective picture quality measurement method known to those skilled in the art. It includes three dimensions for evaluation of dynamic and complex motion sequences—spatial analysis, temporal analysis and full color analysis. By using a model of the human visual system in a picture differencing process, JND produces results that are independent of the compression process and resulting artifacts.

In one embodiment, the comparison module 514 automatically selects the codec 110 used to generate the compressed scene 512 that has the highest compression quality when compared to the baseline snapshot 508 according to the set of criteria 516. That codec 110 (or an indication thereof) is then output by the selection module 306 as the selected codec 110.

The comparison module 514 tells the AI system 504 which codec 110 was selected for the scene 206. This allows the AI system 504 to make an association between the identified characteristics 502 of the scene 206 and the selected codec 110. Thus, in the future, the AI system 504 may automatically select the codec 110 for a similar scene 206 without the need for retesting by the comparison module 514.

Referring also to FIG. 3, in one configuration, the highest-quality compressed test scene 512a is simply passed to the output module 312 (not shown) to be included in the compressed media signal 210. However, the compression module 310 could recompress the scene 206 using the selected codec 110 in certain embodiments.

Figure 6:
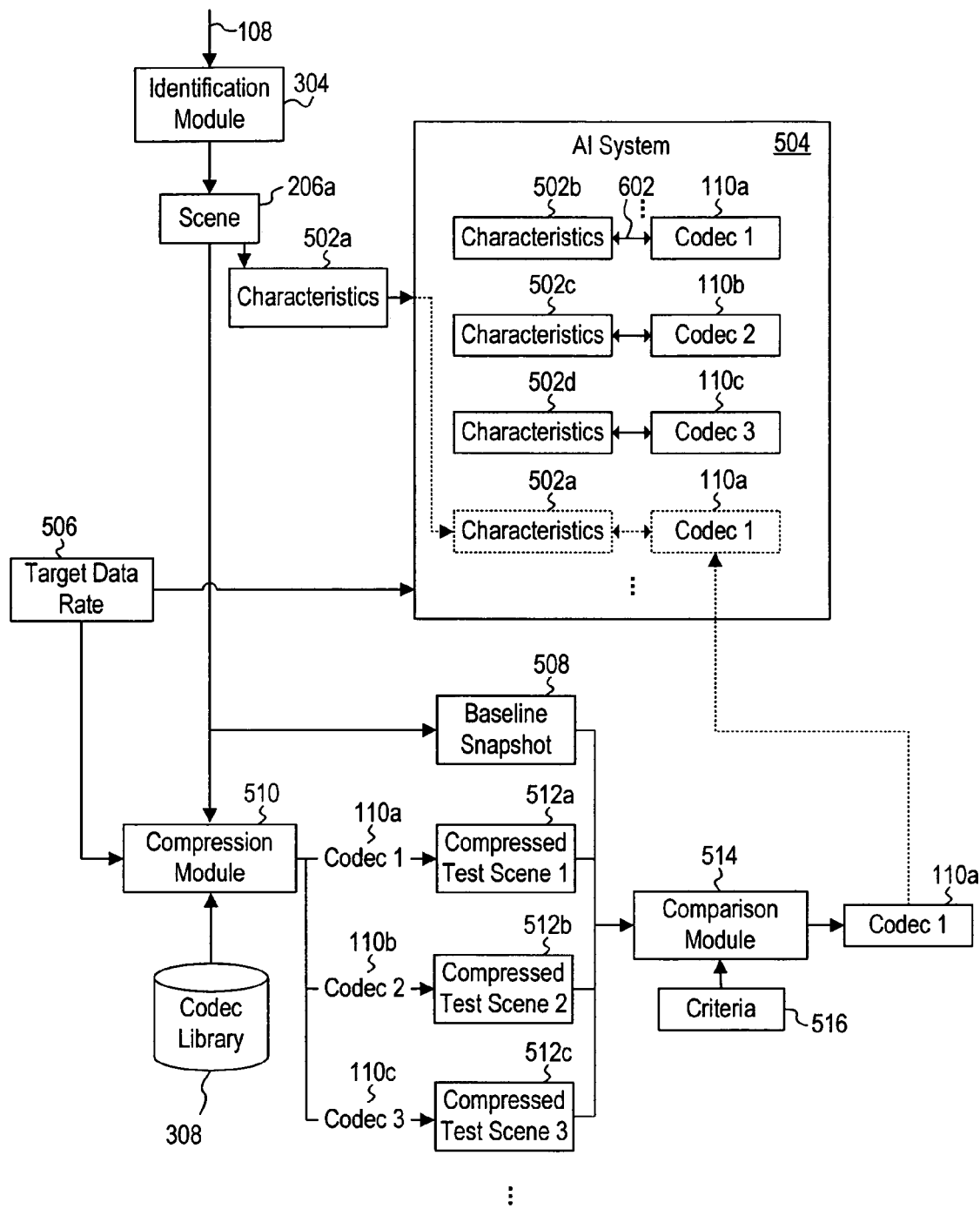
FIG. 6 is a data flow diagram of a process for automatically selecting a codec.

FIG. 6 provides an example of the above-described process. Suppose that the identification module 304 finds a scene 206a having a particular set of characteristics 502a. In one embodiment, the AI system 504 searches an association 602 between the characteristics 502a and a particular codec 110. While the AI system 504 is depicted as including characteristics 502, associations 602, and codecs 110, those skilled in the art will recognize that these entities may be represented by codes, hashes, or other identifiers in various implementations.

Assuming that no such association 602 is found, a baseline snapshot 508 of the scene 206a is taken. In addition, the compression module 510 compresses the scene 206a at the target data rate 506 using a number of different codecs 110a-c from the codec library 308 to create a plurality of compressed test scenes 512a-c. These test scenes 512a-c are then compared against the baseline snapshot 508 according to a set of criteria 516, e.g., PSNR.

Suppose that the compressed test scene 512a produced by one codec 110a ("Codec 1") results in the highest compression quality, e.g., the highest PSNR. In such a case, the comparison module 514 would inform the AI system 504 so that an association 602 could be made between the characteristics 502a of the scene 206a and the selected codec 110a. Thus, if a scene 206 having the same characteristics 502a is encountered in the future, the AI system 504 could simply identify the optimal codec 110a without the need for retesting.

Figure 7:
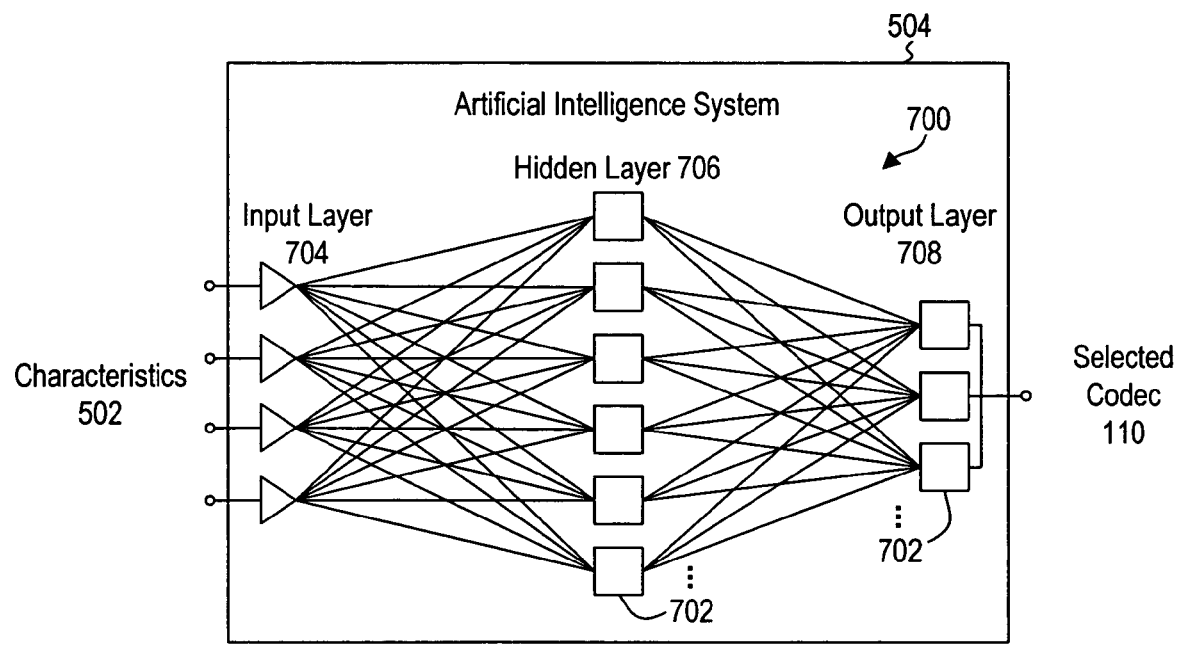
FIG. 7 is a detailed block diagram of an artificial intelligence system.

Referring to FIG. 7, the AI system 504 may be implemented using a typical feedforward neural network 700 comprising a plurality of artificial neurons 702. A neuron 702 receives a number of inputs (either from original data, or from the output of other neurons in the neural network 700). Each input comes via a connection that has a strength (or "weight"); these weights correspond to synaptic efficacy in a biological neuron. Each neuron 702 also has a single threshold value. The weighted sum of the inputs is formed, and the threshold subtracted, to compose the "activation" of the neuron 702 (also known as the post-synaptic potential, or PSP, of the neuron 702). The activation signal is passed through an activation function (also known as a transfer function) to produce the output of the neuron 702.

As illustrated, a typical neural network 700 has neurons 702 arranged in a distinct layered topology. The "input" layer 704 is not composed of neurons 702, per se. These units simply serve to introduce the values of the input variables (i.e., the scene characteristics 502). Neurons 702 in the hidden 706 and output 708 layers are each connected to all of the units in the preceding layer.

When the network 700 is executed, the input variable values are placed in the input units, and then the hidden and output layer units are progressively executed. Each of them calculates its activation value by taking the weighted sum of the outputs of the units in the preceding layer, and subtracting the threshold. The activation value is passed through the activation function to produce the output of the neuron 702. When the entire neural network 700 has been executed, the outputs of the output layer 708 act as the output of the entire network 700 (i.e., the selected codec 110).

While a feedforward neural network 700 is depicted in FIG. 7, those of skill in the art will recognize that other types of neural networks 700 may be used, such as feedback networks, Back-Propagated Delta Rule Networks (BP) and Radial Basis Function Networks (RBF). In other embodiments, an entirely different type of AI system 504 may be used, such as an expert system.

In still other embodiments, the AI system 504 may be replaced by lookup tables, databases, or other data structures that are capable of searching for a codec 110 based on a specified set of characteristics 502. Thus, the invention should not be construed as requiring an AI system 504.

Figure 8:
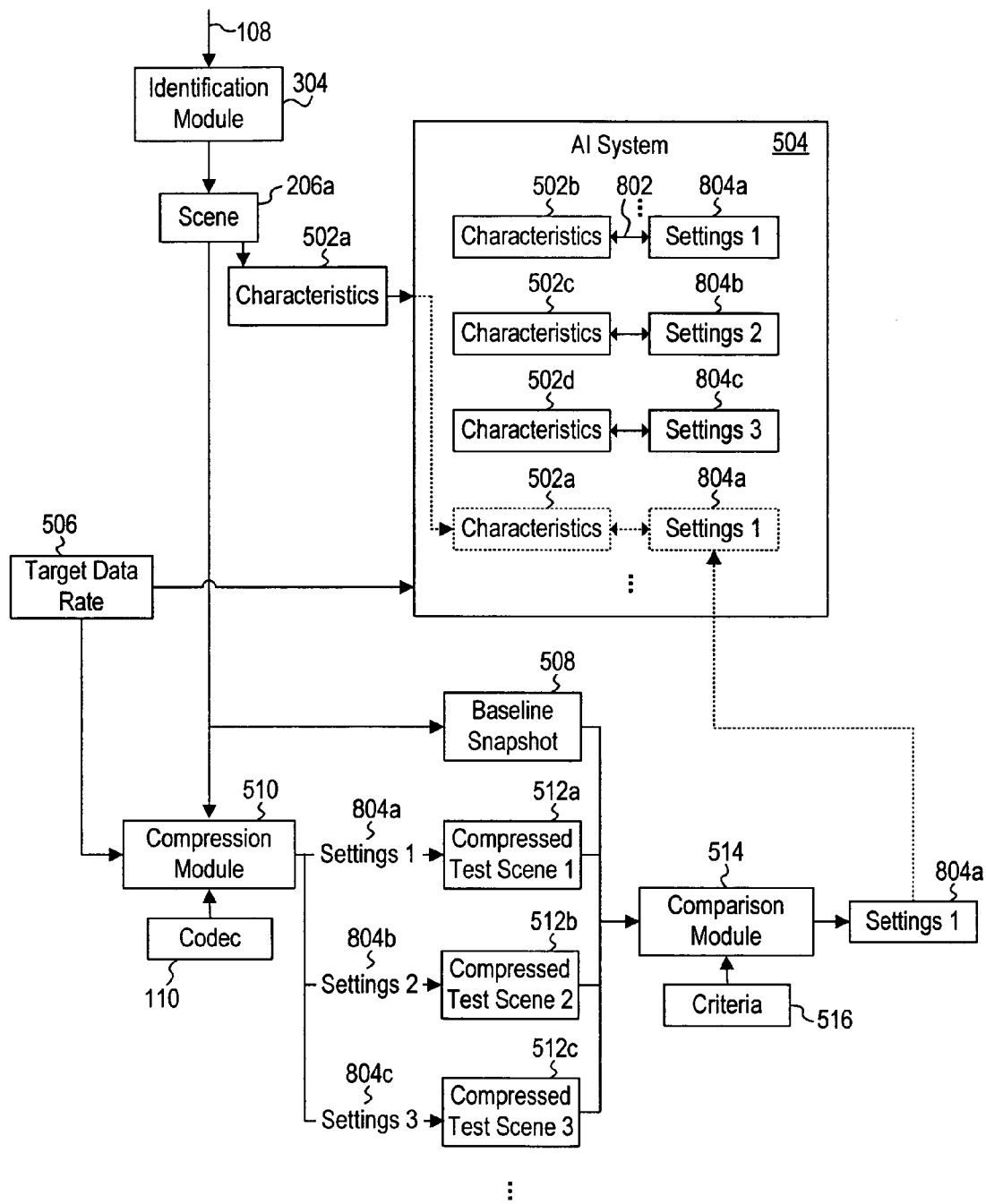
FIG. 8 is a data flow diagram of a process for automatically selecting settings for a codec.

Referring to FIG. 8, the invention is not limited to embodiments in which different codecs 110 are used to respectively encode different scenes 206 of an original media signal 108. As illustrated, a single codec 110 may be used in one embodiment. However, different settings 804 (parameters) for the codec 110 may be automatically selected in much the same way that different codecs 110 were selected in the preceding embodiments.

As used herein, codec settings 804 refer to standard parameters such as the motion estimation method, the GOP size (keyframe interval), types of transforms (e.g., DCT vs. wavelet), noise reduction for luminance or chrominance, decoder deblocking level, preprocessing/postprocessing filters (such as sharpening and denoising), etc.

As before, suppose that the identification module 304 finds a scene 206a having a given set of characteristics 502a. In one embodiment, the AI system 504 searches an association 802 between the characteristics 502a and one or more settings 804a for the codec 110.

Assume that no such association 802 is found. In one configuration, a baseline snapshot 508 of the scene 206a is taken. In addition, the compression module 510 compresses the scene 206a at the target data rate 506 using the same codec 110 but with different settings 804a-c. The resulting compressed test scenes 512a-c are then compared against the baseline snapshot 508 according to a set of criteria 516, e.g., PSNR.

Suppose that the compressed test scene 512a produced by one group of settings 804a ("Settings 1") results in the highest compression quality, e.g., the highest PSNR. In such a case, the comparison module 514 would inform the AI system 504, so that an association 802 could be made between the characteristics 502a of the scene 206a and the selected group of settings 804a. Accordingly, if a scene 206 having the same characteristics 502a is encountered in the future, the AI system 504 could simply identify the optimal settings 804a without the need for retesting.

In still other embodiments, the AI system 504 may search for both different codecs 110 and different codec settings 804 based on a given set of characteristics 502. Likewise, the compression module 510 may generate compressed test scenes 512 based on combinations of different codecs 110 and different settings 804. The comparison module 514 may then select the best combination of codec 110 and settings 804 for a given scene 206.

A more detailed description of a process for dynamically changing settings of a single codec 110 to maintain a particular target data rate is described below with reference to FIGS. 11-15.

Figure 9:
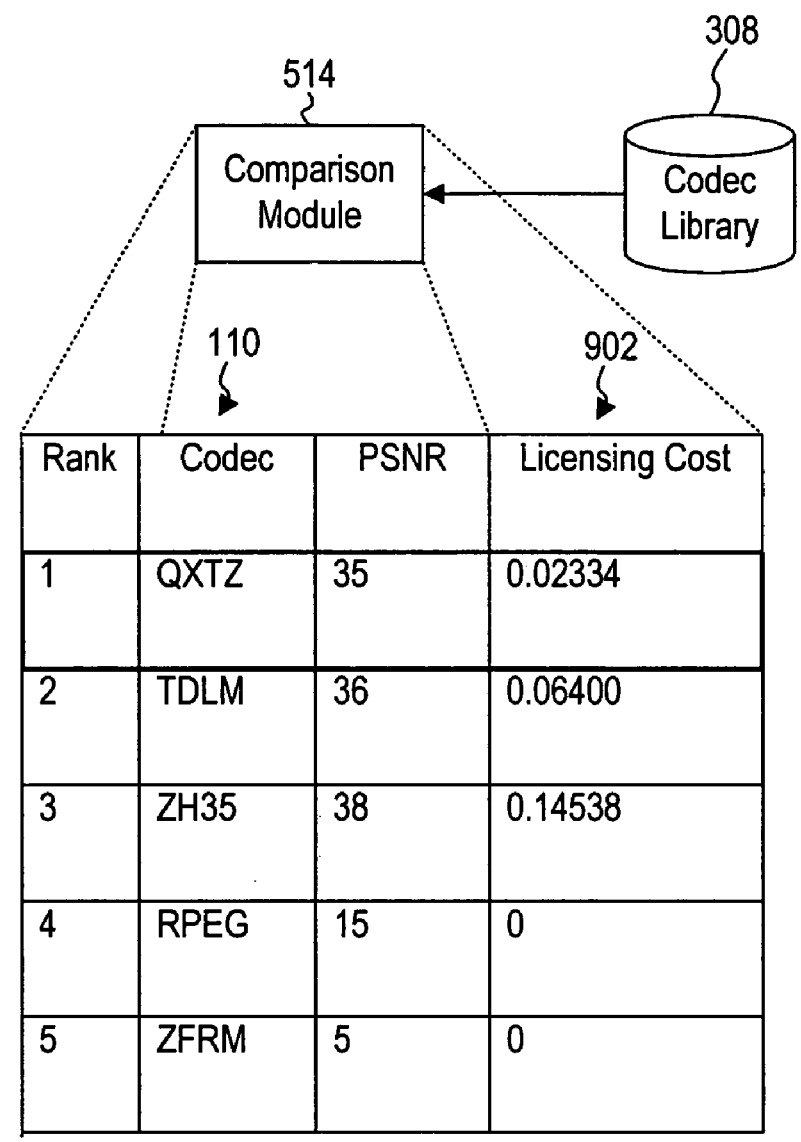
FIG. 9 is a block diagram of a comparison module showing the introduction of a licensing cost factor.

Referring to FIG. 9, the comparison module 514, in one embodiment, may consider other factors in addition to (or in lieu of) compression quality in determining which codec 110 and/or settings 804 to automatically select for a particular scene 206. For instance, the use of certain codecs 110 may incur licensing costs 902 based on patents or other intellectual property rights. The licensing costs 902 may be tied to the number of times the codec 110 is used, the amount of data compressed using the codec 110, or in other ways.

While one codec 110 may provide an exceptionally high compression quality (e.g., PSNR), its licensing cost 902 may exceed the value of the transmission and would not be cost justified. Indications of the licensing costs 902 for various codecs 110 may be stored within the codec library 308 or at other locations accessible by the comparison module 514.

In one embodiment, the licensing costs 902 are considered only when a number of the top codecs 110 produce similar results, e.g., the compression qualities differ by no more than a threshold amount. In the example of FIG. 9, the first three codecs 110 produce output of similar quality. However, the codec 110 with the highest PSNR score is more than two times more expensive than the codec 110 with the next highest PSNR score, which is, itself, almost three times more expensive than the codec 110 with the third highest PSNR score. In one configuration, the comparison module 510 would select the codec 110 with the third highest PSNR score due to its much lower licensing cost 902.

In other embodiments, the comparison module 514 may create a composite score (not shown) based on the PSNR score, the licensing cost 902, and other possible factors. In still other embodiments, the comparison module 514 may calculate an anticipated cost (not shown) for the entire transmission and seek to minimize that cost over all of the codec selection decisions. Hence, the comparison module 514 might select a more expensive codec 110 for certain scenes 206, where a substantial increase in quality is realized, while selecting less expensive codecs 110 for other scenes.

Figure 10:
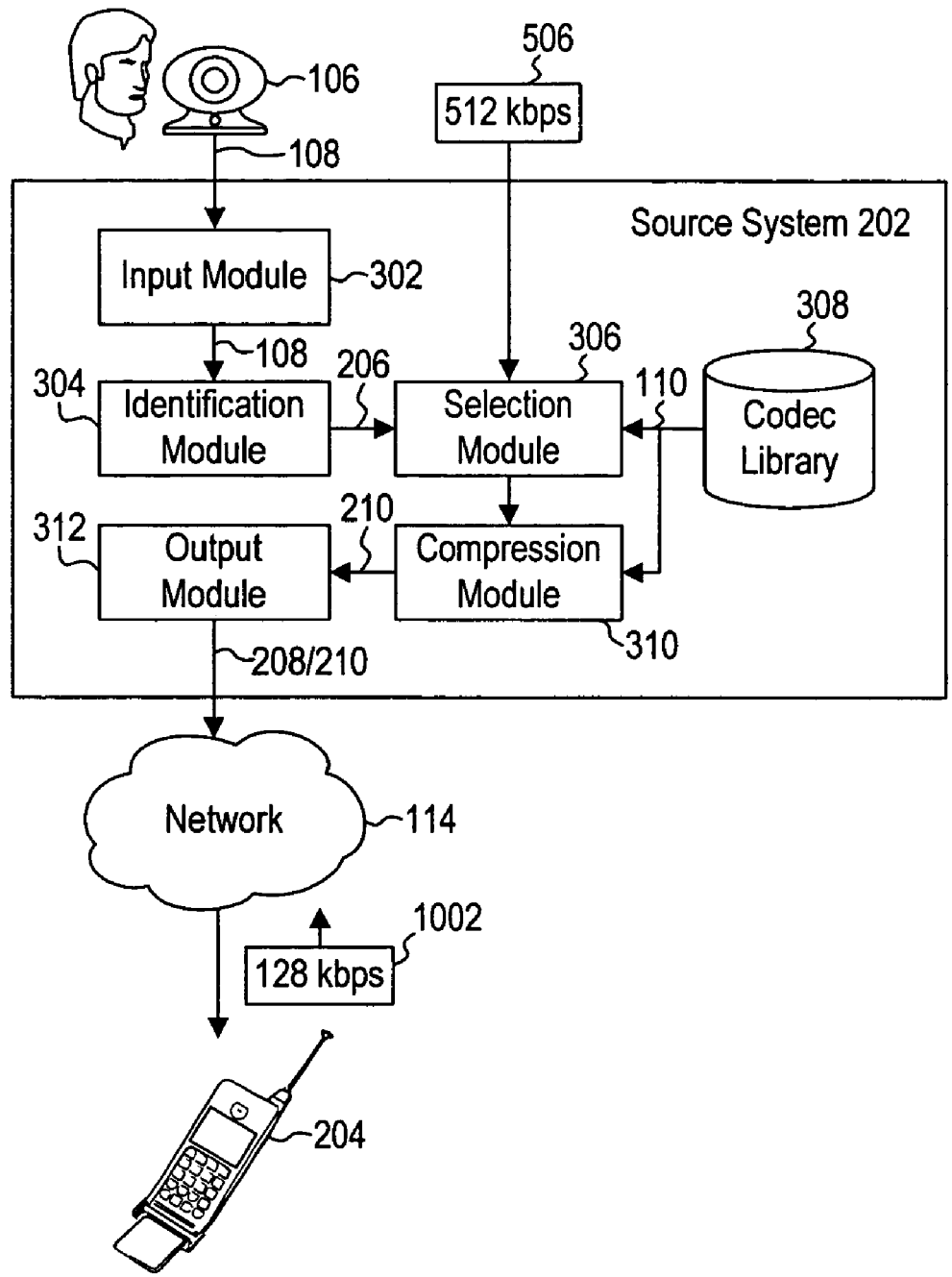
FIG. 10 is a block diagram of a process for modifying a target data rate.

Referring to FIG. 10, a user of the source system 202 may specify a particular target data rate 506, e.g., 512 kbps, for video communication. However, there is no guarantee that the destination system 204 may be able to process data that quickly. Moreover, there is no guarantee that the network 114 will always provide the same amount of bandwidth. As a result, there may be a need to periodically change the target data rate 506 within the selection module 306 of the source system 202, since the target data rate 506 will affect which codecs 110 are selected for various scenes 206.

For example, as shown in FIG. 10, the destination system 204 may be embodied as a video-enabled cellular telephone. Typically, the bandwidth over cellular networks 114 is limited. Similarly, the processing power of a cellular telephone is substantially less than that of a personal computer or dedicated video conferencing system.

Thus, although the user of the source system 202 specifies a target data rate 506 of 512 kbps, the destination system 204 and/or network 114 may not be up to the challenge. In one embodiment, in response to receiving a connection request, the destination system 204 provides the source system 202 with a modified target data rate 1002, e.g., 128 kpbs. The modified rate 1002 may be communicated to the source system 202 using any standard data structure or technique. Thereafter, depending on the configuration, the target data rate 506 may be replaced by the modified rate 1002.

In certain embodiments, an actual data rate is not communicated. Rather, a message is sent specifying one or more constraints or capabilities of the destination system 204 or network 114, in which case it would be up to the source system 202 to revise the target data rate 506 as appropriate. A technique of altering the target data rate 506 in response to various conditions is referred to herein as "dynamic streaming."

In one embodiment, dynamic streaming may be employed where no specific message is sent by destination system 204. The source system 202 may use latency calculations, requests to resend lost packets, etc., to dynamically determine the target data rate 506 for purposes of codec and/or parameter selection.

Figure 11:
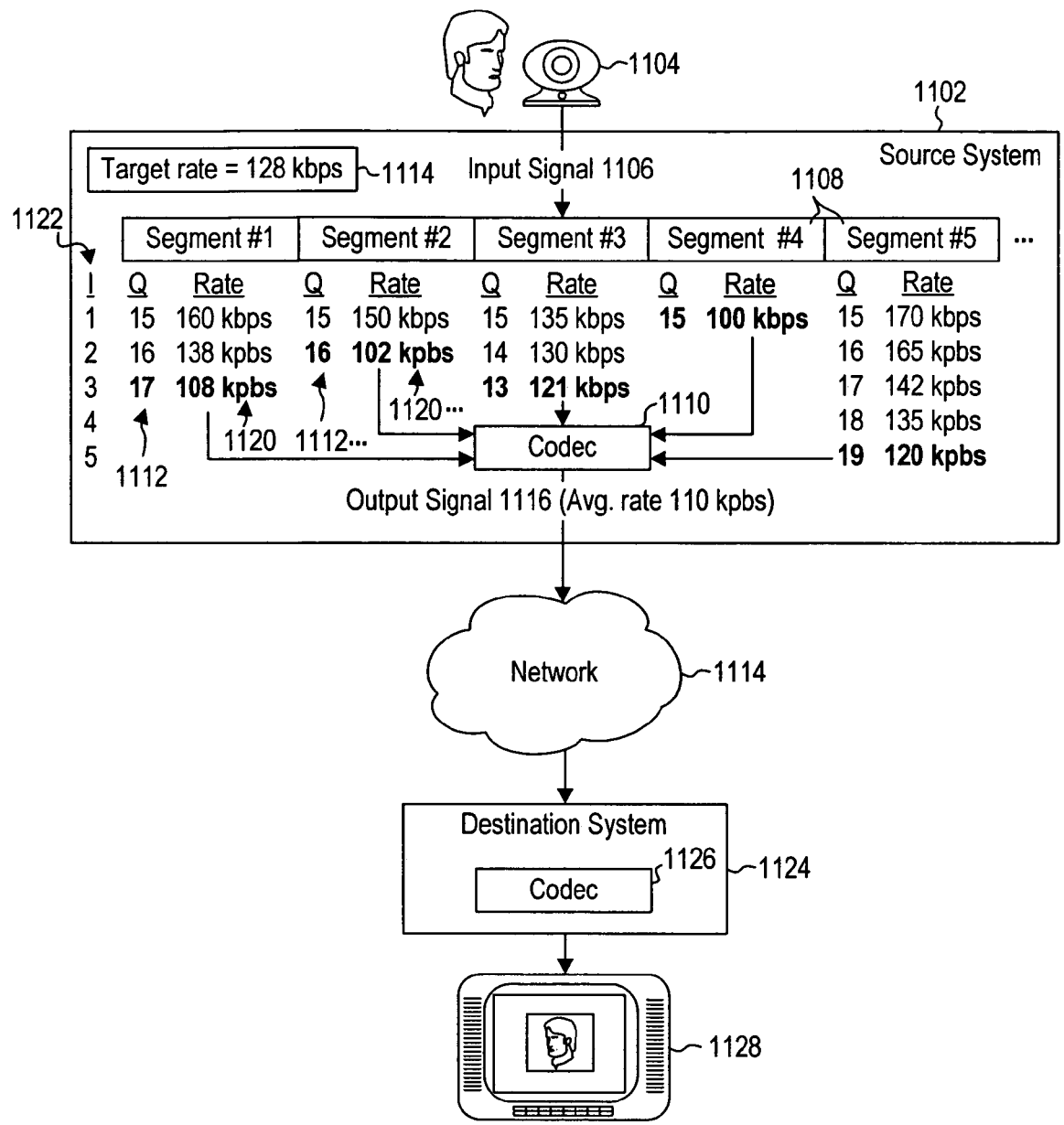
FIG. 11 is a block diagram of an alternative video communication system according to an embodiment of the invention.

FIG. 11 is a block diagram of a video communication system according to an embodiment of the invention that relies on dynamically changing settings or parameters of a single codec rather than switching between different codecs. In various implementations, codec switching may be combined with codec-setting switching to achieve even more optimal results than using either process alone.

As before, a source system 1102 may include a camera 1104 or other device for capturing an input signal 1106. In various embodiments, the source system 1102 may be embodied as a personal computer, videophone, dedicated video conferencing system, or other system or device for enabling video communication.

As illustrated, the input signal 1106 is divided into a plurality of segments 1108. In one embodiment, a segment 1108 includes one or more "frames" of the input signal 1106. A frame is generally defined as a single image in a series of images. The NTSC standard provides for 30 interlaced video frames per second. A segment 1108 may also represent time divisions of the input signal 1106, e.g., one second of video. In alternative embodiments, the segments 1108 may vary in length. For instance, a segment 1108 may correspond to a scene 206, as described above, which may be of arbitrary duration.

Conventionally, a standard codec 1110 would compress all of the segments 1108 using a single, pre-selected set of quality settings 1112. Quality settings 1112 vary from codec to codec. Examples of various quality settings 1112 for one codec 1110 are provided hereafter in Table 2.

Unfortunately, the standard approach of using the same quality settings 1112 throughout a communication session has many disadvantages. For example, if the bandwidth needed to compress a given segment 1108 is higher than the available bandwidth, various problems, such as video jerkiness (frame loss), audio degradation, and the like, may result.

To avoid these problems, the source system 1102 establishes a target rate 1114 for an output signal 1116 that is less than or equal to the maximum data rate for a network 1118 or device that is to receive the signal 1116. In one embodiment, the target rate 1114 is specified by the user, typically from a menu of allowable values. For instance, in the depicted embodiment, the user selected a target rate 1114 of 1128 kbps (kilobits per second).

In an alternative embodiment, the target rate 1114 may be automatically selected by the source system 1102 based on the known or calculated capacity of the network 1118 or receiving device. For instance, a DSL network may have a maximum throughput of 512 kbps, in which case the system 1102 may automatically select a target rate 1114 that is less than 512 kbps.

After the target rate 1114 has been established, the source system 1102 uses the codec 1110 to test various quality settings 1112 on each segment 1108 to find a quality setting 1112 that does not result in an output signal 1116 which exceeds the target rate 1114 when a segment 1108 compressed using the quality setting 1112 is added to the output signal 1116.

Table 2 sets forth a few of the possible quality settings 1112 that may be tested. Manipulating certain settings 1112, however, has little effect on the data rate of the output signal 1116. Three settings that do have a noticeable impact on data rate include the quality quantizer (Q), the frame size, and the frame rate.

TABLE 2

| Setting | Range | Effect |
| --- | --- | --- |
| HQ | On/Off | Force a macroblock decision method to increase quality. |
| 4MV | On/Off | Use four motion vectors per macroblock to increase quality. |
| QPEL | On/Off | Use quarter picture element motion compensation methods to increase quality. |
| GMC | On/Off | Use global movement compensation to increase quality. |
| NAQ | On/Off | Normalize adaptive quantization to average quality over all macroblocks. |
| ME | n | Select motion estimation method, each algorithm with varying quality production. |
| Bit Rate | n | Bandwidth setting. Quality varies with this. |
| Bit Rate Tolerance | n | Variance from the average bit rate setting. Quality varies with this as it allows bandwidth changes. |
| Frame Rate | n | Video frames per second (fps). Movie rates are ~24 fps, TV are ~30 fps. Less reduces quality. |

TABLE 2-continued

| Setting | Range | Effect |
| --- | --- | --- |
| Frame Size | width, height | Video frame size. Reduce from the original size and still hold the entire frame requires fewer picture elements and so reduces quality. |
| Aspect Ratio | n | Select video width-to-height ratio: square, 4:3 NTSC (525 lines), 4:3 PAL (625 lines), 16:9 NTSC, 16:9 PAL, extended. Fitting to destination display requirements. Wrong fit reduces quality. |
| GOP | n | Group of pictures. Frequency of the I frame containing full-frame data in the frame count. Smaller numbers increase the data size. Bigger numbers increase the compression. |
| Sample Rate | n | Audio samples per second. Greater quantities increase the data size. |
| Q | 1 ... 31 | Quality quantizer to force a specific overall quality level. Smaller numbers tend to increase the data size. Bigger numbers increase the compression. |
| Q Compress | 0.0 ... 1.0 | Quantizer change allowed between scenes. More reduces quality. |
| Q Blur | 0.0 ... 1.0 | Quantizer smoothing allowed over time. More reduces quality. |
| Q Min | 1 ... Q | Minimum quality quantizer level allowed. Wide variance from Q reduces quality. |
| Q Max | Q ... 31 | Maximum quality quantizer level allowed. Wide variance from Q reduces quality. |
| Q Diff | 1 ... 31 | Maximum quality quantizer level difference allowed between frames. Wide variance reduces quality. |
| MPEG Quant | On/Off | Off = H.263 quantizer. On = MPEG quantizer. On increases quality. |
| RC Q Squish | On/Off | Rate control limiting Q within Q Min and Q Max. Varies quality by clipping or producing continuous limiting. |
| RC Max Rate | n | Rate control maximum bit rate. |
| RC Min Rate | n | Rate control minimum bit rate. |
| Luma Elim Threshold | n | Limiting threshold on luminence component. |
| Chroma Elim Threshold | n | Limiting threshold on chrominance components. |
| I Quant Factor | n | Quality quantizer level difference between I and P frames. Greater difference reduces quality. |
| I Quant Offset | n | Quality quantizer to determine which P frame's quantizer or whether rate control changes the quality difference between I frames and P frames. Greater values reduce quality. |
| Aspect Ratio Custom | width, height | Special width and height settings used when Aspect Ratio is set to "extended." Wrong fit reduces quality. |
| DCT Algorithm | 0 ... n | Several algorithms available to determine the form of discrete cosine transform. |
| PTS | n | Presentation time stamp in microseconds controlling when codec must complete. Too soon related to frame rate reduces quality. |
| Luminance Masking | n | Varies quality when enabled. |
| Temporal Complexity Masking | n | Varies quality when enabled. |
| Spatial Complexity Masking | n | Varies quality when enabled. |
| P Masking | n | Varies quality when enabled. |
| Darkness Masking | n | Varies quality when enabled. |
| IDCT Algorithm | 0 ... n | Several algorithms available to determine the form of discrete cosine transform. |

As shown in FIG. 11, the system 1102 may automatically test different quality quantizers (Q), which define, for certain codecs 1110, stair step functions that reduce the number of bits used to encode video coefficients. The system 1102 may begin with an initial quality setting 1112 (e.g., Q=15) and calculate the data rate 1120 (e.g., 160 kbps) that would result from compressing segment #1 using that quality setting 1112.

If the calculated rate 1120 is higher than the target rate 1114, the system 1102 automatically selects a new quality setting 1112 that results in a lower calculated rate 1120 for the output signal 1116. In the example of FIG. 11, higher Q settings 1112 typically result in lower calculated rates 1120. In this context, "automatically selected" means that the quality setting 1112 is selected without human intervention. It is known in the art for video engineers to manipulate quality settings 1112 of a video signal. However, such manipulation requires considerable skill, is time-intensive, and cannot be done in real time.

While the following description often refers to quality setting 1112 in the singular, it should be recognized that the system 1102 may test multiple quality settings 1112 in order to select the best combination. Hence, reference herein to "quality setting" should be construed to mean "one or more quality settings."

Various techniques for automatically selecting a quality setting 1112 are described below. However, in the depicted embodiment, the source system 1102 may automatically select the next higher or lower quality setting 1112, depending on how changes to that setting 1112 affect the calculated rate 1120. For instance, increasing the quality quantizer by a step typically results in a lower calculated rate 1120. Increasing other quality settings 1112 may produce the opposite result.

The system 1102 may go through a number of iterations 1122 of testing before finding a quality setting 1112 that produces a calculated rate 1120 that is less than or equal to the target rate 1114. For instance, in the case of segment #1, three iterations 1122 are required, while five iterations are needed for segment #5. In some cases, as with segment #4, the initially selected quality setting 1112 already results in a calculated data rate 1120 that is less than or equal to the target rate 1114.

Once a quality setting 1112 is found that results in a compressed segment 1108 that does not cause the output signal 1116 to exceed the target rate 1114, the system 1102 adds the compressed segment 1108 to the output signal 1116. Thus, each segment 1108 may be potentially compressed using different quality settings 1112, unlike conventional approaches which rely on a single set of quality settings 1112 for the entire communication session.

The output signal 1116 is then sent to a destination system 1124, in one embodiment, through the network 1118. The network 1118 may be a local area network (LAN), the Internet, or another suitable communication network. Like the source system 1102, the destination system 1124 may be embodied as a personal computer, videophone, dedicated video conferencing system, or the like.

Within the destination system 1124, a similar or identical codec 1126 decompresses the signal 1116 received from the source system 1102 using conventional techniques. Typically, the output signal 1116 need not include special indicators of the selected quality settings 1112 for each segment 1108. Most codecs 1110 are able to dynamically detect setting changes using the output signal 1116 as a reference. The resulting decompressed signal may then be displayed on a display device 1128, such as a television, computer monitor, or the like.

Assuming that a segment 1108 comprises one frame of NTSC video, the source system 1102 may have, for example, approximately 30 milliseconds to automatically select a quality setting 1112. Given a sufficiently powerful source system 1102, the above-described process of testing and automatically selecting a quality setting 1112 for each segment 1108 may be accomplished in real time.

Advantageously, because the selected quality setting 1112 is tailored to the target rate 1114, there is little chance that the bandwidth required to send a particular segment 1108 will exceed the available bandwidth (assuming that the chosen target rate 1114 provides a sufficient cushion for network problems). Hence, the difficulties of frame loss and audio degradation of conventional systems are reduced or substantially eliminated.

Figure 12:
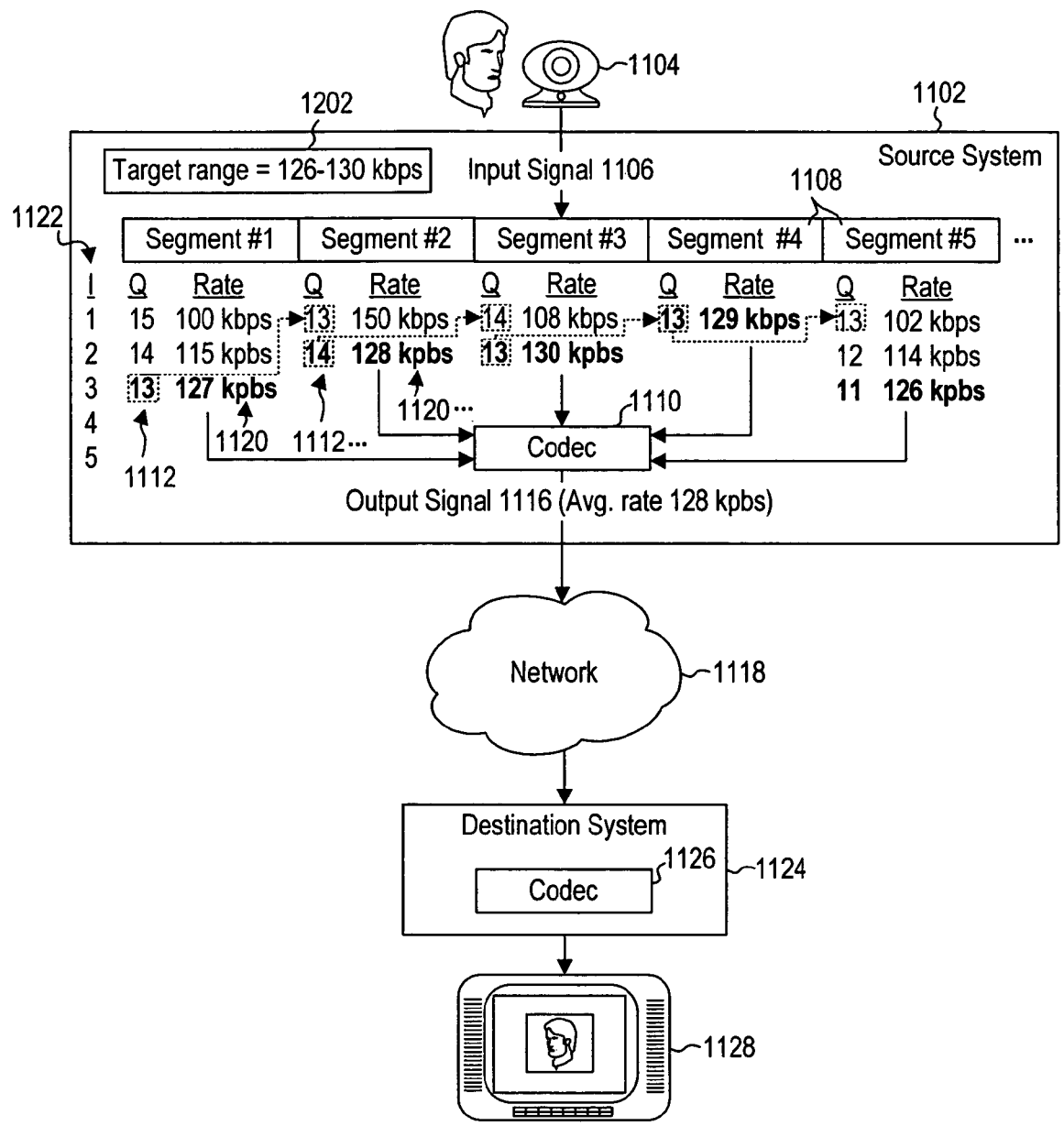
FIG. 12 is a block diagram of yet alternative embodiment of a video communication system.

FIG. 12 illustrates an alternative video communication system that provides more precise control over the data rate of the output signal 1116. In the system of FIG. 11, the initially-selected quality setting 1112 may already result in a data rate for the output signal 1116 that is significantly lower than the target rate 1114. Also, the system of FIG. 11 only reduces the calculated rate 1120 for a segment 1108 until it is less than or equal to the target rate 1114. Thus, the resulting output signal 1116 will typically have an average data rate that is lower than the target rate 1114 (e.g., 110 kbps in FIG. 11). Because the data rate impacts video quality, the output signal 1116 may be of lower quality than it could have been had it been closer to the target rate 1114.

Accordingly, in one embodiment, rather than always starting with the same initial quality setting 1112 for each segment 1108, the system 1102 will begin with the automatically-selected quality setting 1112 for the previous segment 1108. This is based on the fact that adjacent segments 1108 will often have very similar characteristics. Hence, the automatically-selected quality setting 1112 for one segment 1108 will likely be applicable to the following segment 1108. The exception to the above would be the initial quality setting 1112 for the first segment 1108, which could be arbitrarily selected or predefined.

As further illustrated in FIG. 12, the system 1102 may establish a target range 1202 rather than a target rate 1114. The target range 1202 is a range of acceptable data rates for the output signal 1116. In one configuration, the target range 1202 could be defined as a target rate 1114 with an allowable threshold distance, e.g., +/−2 kbps.

As before, if the calculated rate 1120 is higher than the target range 1202 (as with segment #2), the system 1102 automatically selects a new quality setting 1112 that reduces the calculated rate 1120 for the output signal 1116. However, if the calculated data rate 1120 for the initially-tested quality setting 1112 is already lower than the target range (as with segment #1), the system 1102 will automatically select a new quality setting 1112 that increases the calculated data rate 1120. In the illustrated embodiment, this may be accomplished by reducing the quantizer (Q) quality setting 1112. Other quality settings 1112 may require different adjustments.

The system 1102 may continue to test new quality settings 1112 through multiple iterations 1122 until it identifies a setting 1112 that produces a calculated data rate 1120 for the output signal 1116 that is within the target range 1202. In one embodiment, if no quality setting 1112 (or combination of settings 1112) will produce a calculated data rate 1120 within the target range 1202, then the system 1102 may select the quality setting 1112 that produces the calculated data rate 1120 that is closest to (and/or lower than) the target range 1202.

Additionally, in order to compress the input signal 1106 in real time, a time limit may be established for testing quality settings 1112 on each segment 1108. Therefore, if the time limit runs out before the ideal quality setting 1112 is found, the most recently tested quality setting 1112 may be automatically selected.

The net result of the above-described techniques is to more quickly arrive at the correct quality settings 1112 for each segment 1108, while maintaining the data rate that is as close as possible to the target range 1202. In the example of FIG. 1, the average data rate for the output signal 1116 was 110 kbps, as opposed to an average output data rate of 1128 kbps for FIG. 12. Thus, the quality level of the output signal 1116 in FIG. 12 is likely to be better.

As previously noted, the present invention is not limited to manipulating a single quality setting 1112 of a codec 1110 for each segment 1108. In various embodiments, the system 1102 may test different combinations of quality settings 1112 to find the ideal combination. The main limiting factor is the need to complete the testing within a specified period of time in order to facilitate real-time compression. This may not be the case in every embodiment, however, and greater time may be spent in creating an output signal 1116 that is precisely tailored to a particular target rate 1114 or range 1202. For instance, where the output signal 1116 is to be stored on media, e.g., a DVD, greater care may be taken to achieve the optimal settings 1112.

Figure 13:
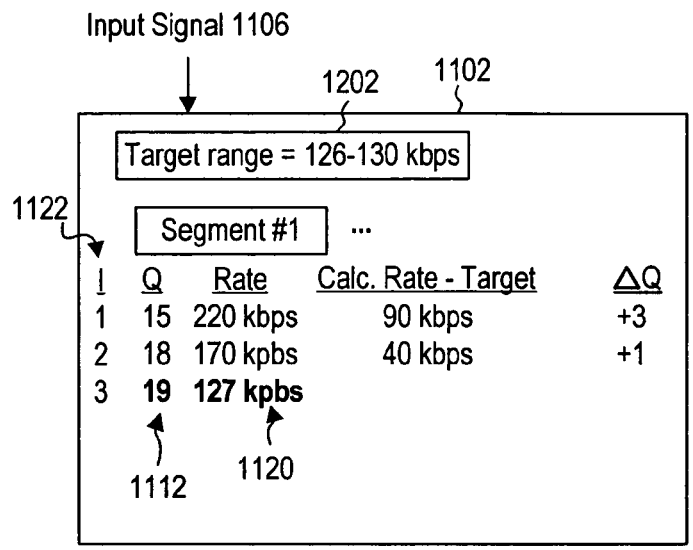
FIG. 13 is a graph of a selection function.
Figure 13:
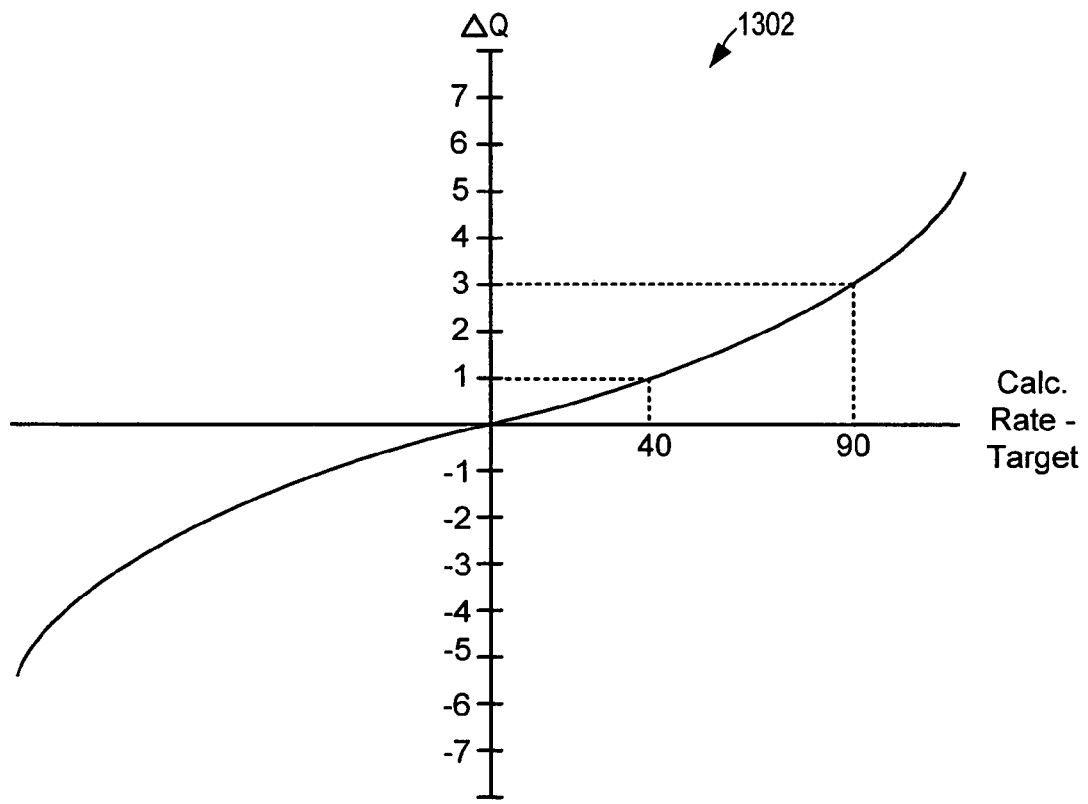

FIG. 13 illustrates an alternative process for automatically selecting a quality setting 1112. As described above, the source system 1102 may initially test a pre-selected quality setting 1112. However, subsequently-selected quality settings 1112 may be a function of the distance between the calculated data rate 1120 and the target range 1202 (or rate 1114). This helps the source system 1102 to minimize the number of iterations 1122 required to find the optimal quality setting 1112.

In one embodiment, the source system 1102 determines the difference between the calculated data rate 1120 and the target range 1202 (or rate 1114). That difference is applied to a selection function 1302 that returns the change in the quality setting 1112 (e.g., Δ Q) or the new quality setting 1112 itself. The selection function 1302 is typically a non-linear function that may be derived from experimental data and will vary depending on the particular quality setting 1112 and codec 1110 in question.

In the example of FIG. 13, the first iteration 1122 results in a difference between the calculated rate 1120 and the target range 1202 of 90 kbps. Applying the selection function 1302, the quantizer quality setting 1112 is to be increased by three steps. In the subsequent iteration 1122, the difference is only 40 kbps, resulting in an increase of one step for the quantizer quality setting 1112. Those of skill in the art will recognize that this approach saves two iterations 1122 in the present example when compared to the linear approach of FIGS. 11 and 12. In still other embodiments, a binary search pattern or other algorithms may be employed to minimize the number of iterations 1122 for each segment 1108.

Figure 14:
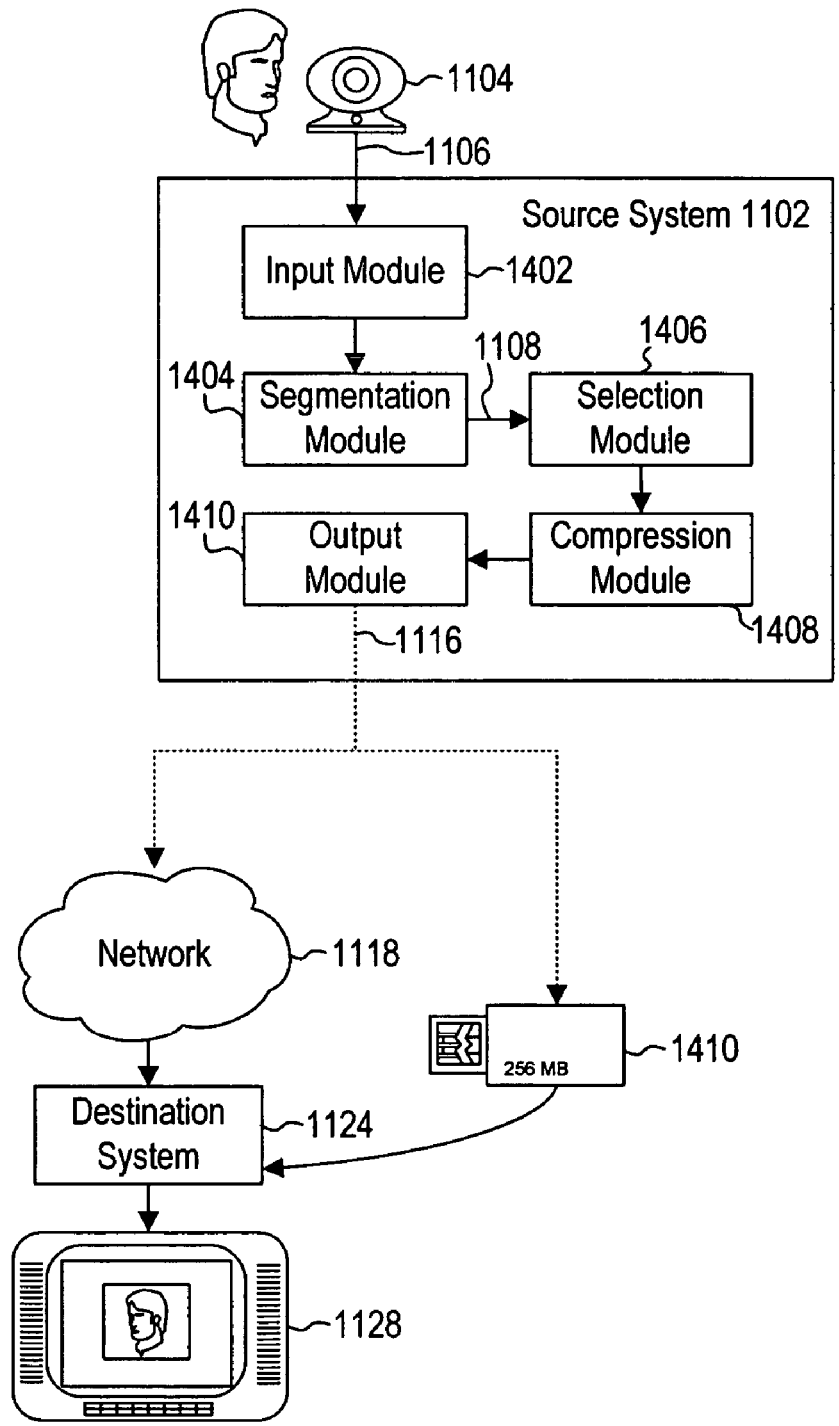
FIG. 14 is a block diagram of various functional modules of a source system.

FIG. 14 is a high-level overview of functional modules within the source system 1102. Those of skill in the art will recognize that the functional modules may be implemented using any suitable combination of hardware and/or software. Furthermore, various functional modules may be combined, or the functionality of a single module may be divided between two or more modules within the scope of the invention.

An input module 1402 may provide an interface for receiving the input signal 1106 from the camera 1104. A segmentation module 1404 may divide the input signal 1106 into a plurality of segments 1108, as described with reference to FIG. 11.

A selection module 1406 may automatically select one or more quality settings 1112 for each segment 1108, which are then used by a compression module 1408 to compress the segments 1108. An output module 1410 delivers an output signal 1116 including the compressed segments 1108 to the destination system 1124.

As illustrated, the delivery of the output signal 1116 may be accomplished in different ways. In one embodiment, the output signal 1116 may be transmitted to the destination system 1124 via the network 1118. Alternatively, the output signal 1116 may be stored on a multimedia distribution device 1412, such as a USB stick, flash memory card, etc., which is physically delivered to the destination system 1124. In still other embodiments, the output signal 1116 may be stored on recordable media, such as a DVD or CD.

Figure 15:
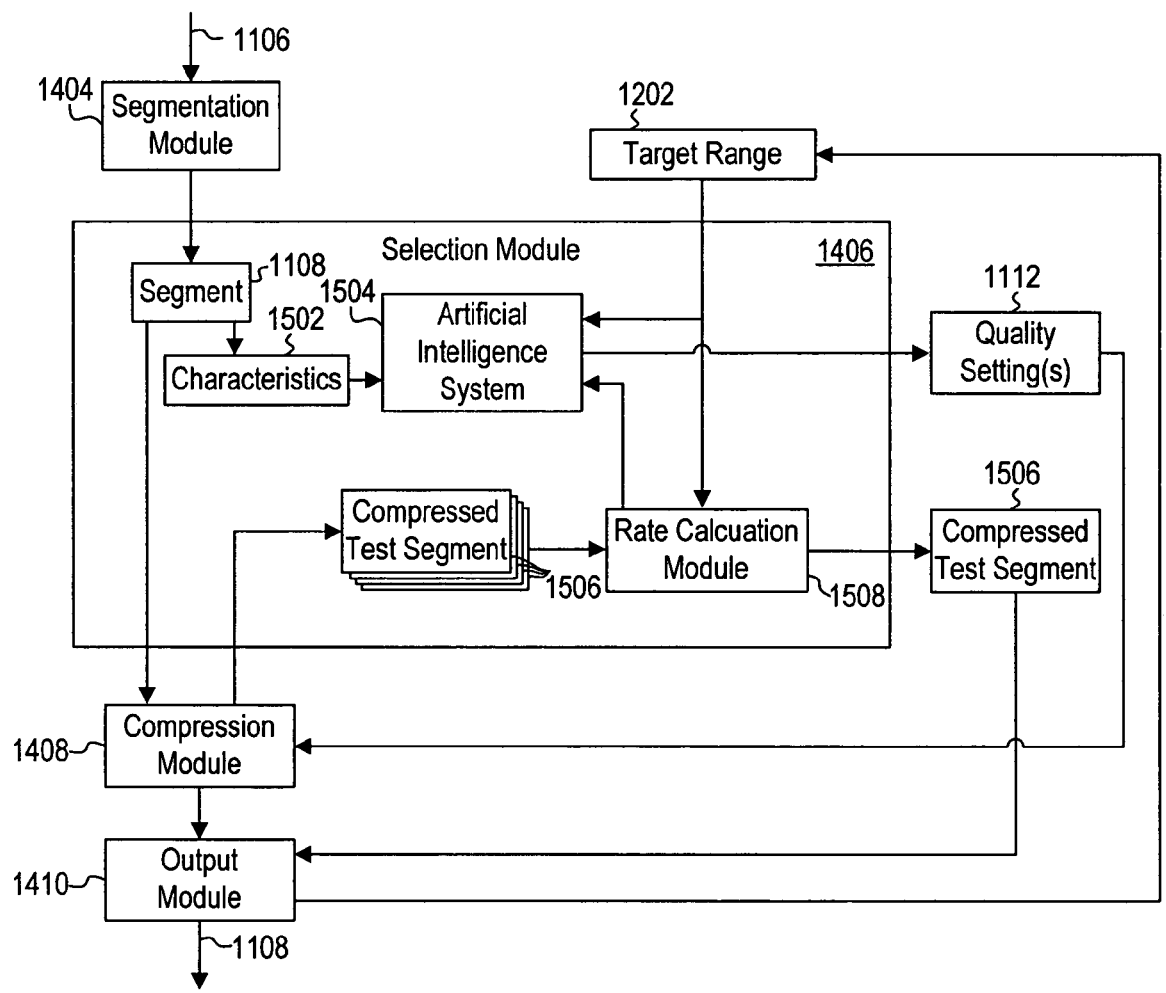
FIG. 15 is a detailed block diagram of a selection module.

FIG. 15 illustrates additional details of the selection module 1406 according to one implementation of the invention.

The segmentation module 1404, in addition to dividing the input signal 1106 into a plurality of segments 1108, may also identify one or more characteristics 1502 of each segment 1108. The characteristics 1502 may include, for instance, motion characteristics, color characteristics, YUV signal characteristics, color grouping characteristics, color dithering characteristics, color shifting characteristics, lighting characteristics, and contrast characteristics. Those of skill in the art will recognize that a wide variety of other characteristics of a segment 1108 may be identified within the scope of the invention.

Motion is composed of vectors resulting from object detection. Relevant motion characteristics may include, for example, the number of objects, the size of the objects, the speed of the objects, and the direction of motion of the objects.

With respect to color, each pixel typically has a range of values for red, green, blue, and intensity. Relevant color characteristics may include how the ranges of values change through the frame set, whether some colors occur more frequently than other colors (selection), whether some color groupings shift within the frame set, whether differences between one grouping and another vary greatly across the frame set (contrast).

In one embodiment, an artificial intelligence (AI) system 1504, such as a neural network or expert system, receives the characteristics 1502 of the segment 1108, as well as a target range 1202 (or rate 1114) for the output signal 1116. The AI system 1504 may be similar or identical to the AI system 504 described with reference to FIG. 7.

The AI system 1504 then determines whether one or more quality settings 1112 have been previously found to optimally compress a segment 1108 with the same characteristics 1502. As explained below, the AI system 1504 may be conceptualized as "storing" associations between sets of characteristics 1502 and optimal quality settings 1112. If an association is found, the selection module 1406 may simply output the quality setting(s) 1112 to the compression module 1408 without the need for testing.

In many cases, however, a segment 1108 having the given characteristics 1502 may not have been previously encountered. Accordingly, the selection module 1406 uses the compression module 1408 to test different quality settings 1112 on the segment 1108, as described above in connection with FIGS. 11-13.

In one embodiment, the compression module 1408 produces a compressed test segment 1506 for each automatically-selected quality setting 1112. A rate calculation module 1508 then determines the calculated data rate 1120 for the output signal 1116 that would result from adding the respective compressed test segments 1506.

When a quality setting 1112 is found that results in a calculated rate 1120 that is within the target range 1202, the corresponding compressed test segment 1506 is sent to the output module 1410. The rate calculation module 1508 may also notify the artificial intelligence system 1504 so that a record can be made of the selected quality setting 1112 for a segment 1108 of the given characteristics 1502.

As further illustrated in FIG. 15, the target range 1202 (or rate 1114) may be dynamically modified under certain conditions. For example, a buffer within the output module 1410 may indicate that network difficulties have reduced the amount of available bandwidth. In such a case, the output module 1410 may temporarily or permanently reduce the target range 1202 (or rate 1114).

In other embodiments, a user of the source system 1102 may initially request a particular target range 1202 (or rate 1114). However, the destination system 1124, upon receiving a connection request, may indicate that it cannot support the requested target range 1202 (or rate 1114). For instance, the destination system 1124 may be a video-enabled cellular telephone, with limited bandwidth and display capabilities. Accordingly, the destination system 1124 may signal the source system 1102 to request that the target range 1202 be modified before the communication session begins.

Figure 16:
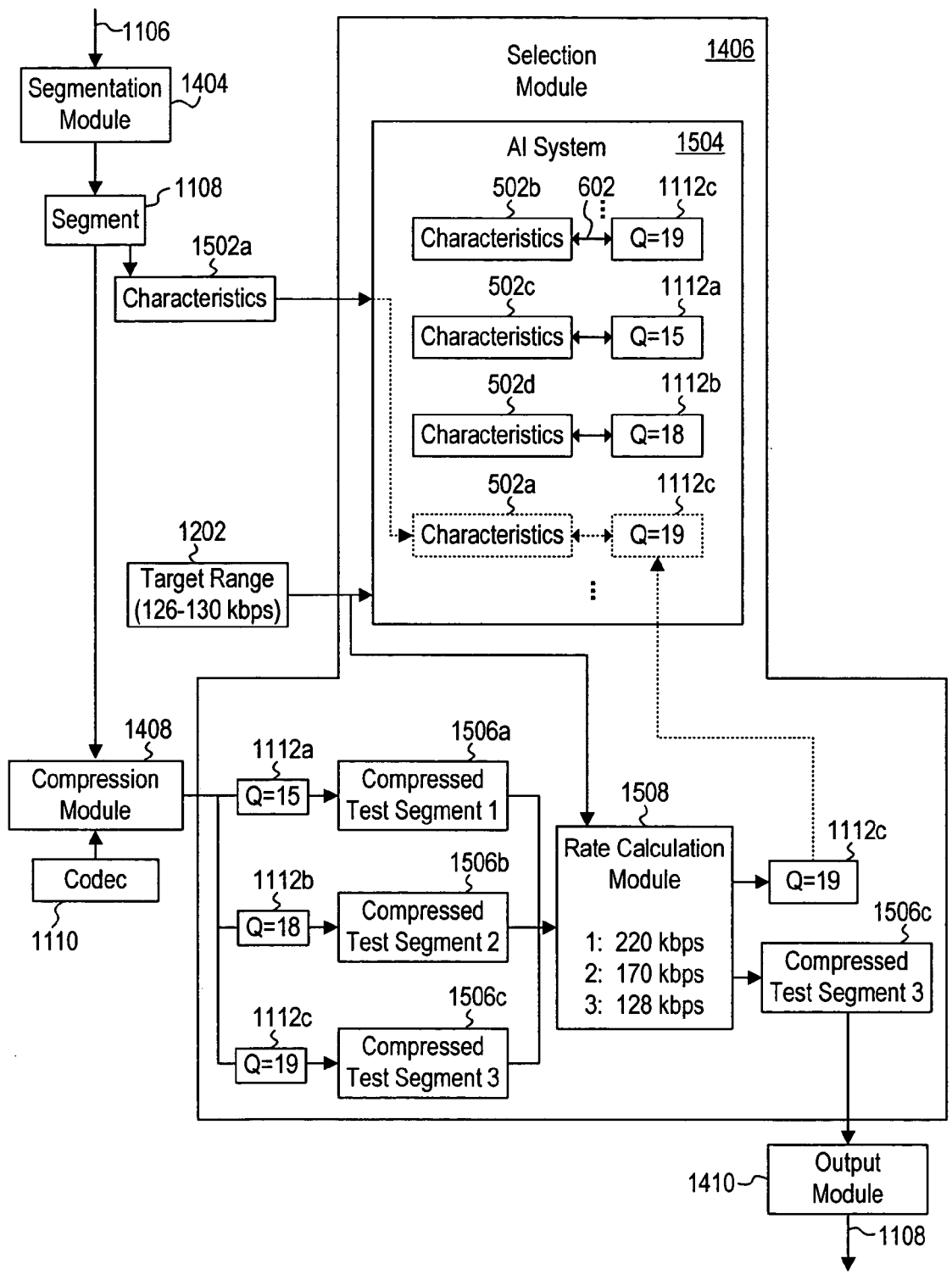
FIG. 16 is a data flow diagram of a process for selecting quality settings for a particular segment.

FIG. 16 provides an example of the process described in FIG. 15. Suppose that the segmentation module 1404 identifies a segment 1108 having a particular set of characteristics 1502a, e.g., color characteristics, motion characteristics, etc. In one embodiment, the AI system 1504 searches for an association 1602 between the identified characteristics 1502a and one or more quality settings 1112, such as a quality quantizer.

Assuming that no such association 1602 is found, the compression module 1408 compresses the segment 1108 using a codec 1110 with an initial quality setting 1112a (e.g., Q=15) to produce a first compressed test segment 1506a. The rate calculation module 1508 determines that the compressed test segment 1506a, if added to the output signal 1116, would result in a data rate of 220 kbps, which is 90 kbps higher than the target range 1202 of 1126-130 kbps.

Applying the selection function 1302 of FIG. 13, the compression module next compresses the segment 1108 using a new quality setting 1112b (e.g., Q=18) to produce a second compressed test segment 1506b. The rate calculation module 1508 then determines that the second compressed test segment 1506b, if added to the output signal 1116, would result in a data rate of 170 kbps, which is still 40 kbps higher than the target range 1202.

Consulting the selection function 1302 again, the compression module finally compresses the segment 1108 using yet another quality setting 1112c (e.g., Q=19) to produce a third compressed test segment 1506c. The rate calculation module 1508 determines that the latest quality setting 1112c will produce a data rate (e.g., 1128 kbps) for the output signal 1116 that is within the target range 1202.

Accordingly, the third compressed segment 1506c is sent to the output module 1410 to be included in the output signal 1116. In addition, the latest quality setting 1112c (e.g., Q=19) is sent to the AI system 1504, where an association 1602 is created between the quality setting 1112c and the identified characteristics 1502a of the segment 1108. The process for creating the association 1602 will vary depending on the particular type of AI system 1504. Subsequently, if a segment 1108 is found to have similar characteristics 1502a, the selection module 1406 may simply retrieve the corresponding settings 1112 from the AI system 1504, either to be used without testing or to serve as an initial quality setting 1112 within the testing process.

Figure 17:
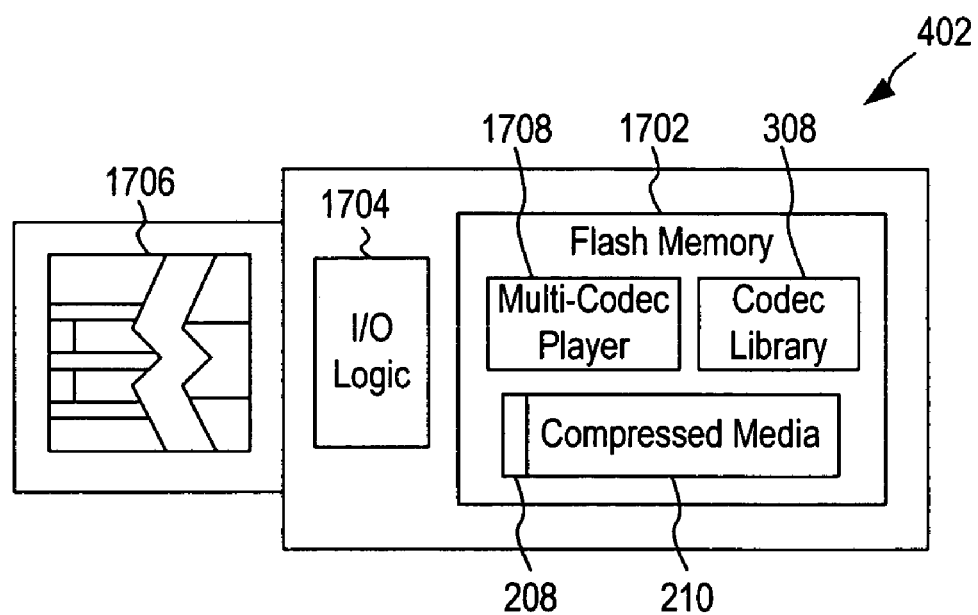
FIG. 17 is a block diagram of various multimedia distribution devices.
Figure 17:
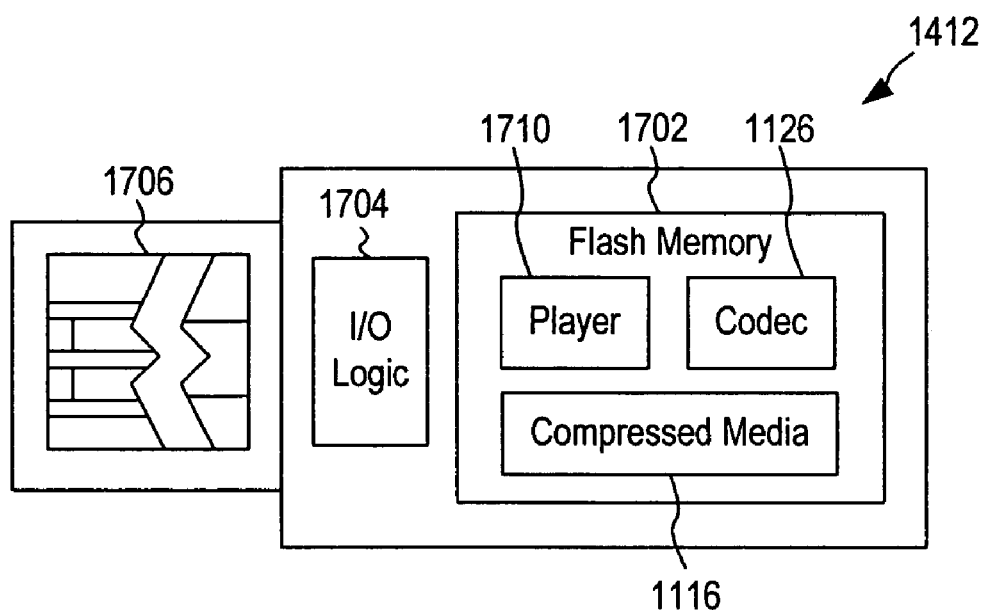

FIG. 17 provides additional details of the multimedia distribution devices 402/1412 described above that may be used to deliver compressed media signals to a destination system. For example, a multimedia distribution device 402 may include, in one embodiment, a flash memory 1702 or other nonvolatile memory device, I/O logic 1704, and an I/O interface 1706.

As illustrated, the multimedia distribution device 402 may be embodied as a USB (Universal Serial Bus) "memory stick." Accordingly, the I/O interface 1706 may be configured as a USB connector, and the I/O logic 1704 may conform to the USB specification, the details of which are known to those skilled in the art. However, various other technologies and form factors are available, such as CompactFlash™, etc.

Devices 402 of the type illustrated in FIG. 17 are available from a variety of manufacturers, including PQI Corporation, and may include different capacities of flash memory 1702, typically ranging from 64 megabytes (MB) to 1 gigabyte (GB).

In a codec-switching embodiment, the flash memory 1702 of the multimedia distribution device 402 may store the compressed media signal 210, as well as a number of codec indicators 208 for specifying which codecs were used to compress various segments or scenes within the compressed media signal 210. The flash memory 1702 may also store a multi-codec player 1708 and the codec library 308. The multi-codec player 1708 uses the codec library 308, as described with reference to FIGS. 2-3, to decode the compressed media signal 210 for display on a display device (not shown).

In a setting-switching embodiment involving a single codec 1126, the flash memory 1702 of the storage device 1412 may store the compressed media 1116, the codec 1126, and a standard (single-codec) player 1710. The following description and examples will deal primarily with the multimedia distribution device 402 in the codec-switching embodiment. However, the invention should not be construed as being limited in this respect.

Figure 18:
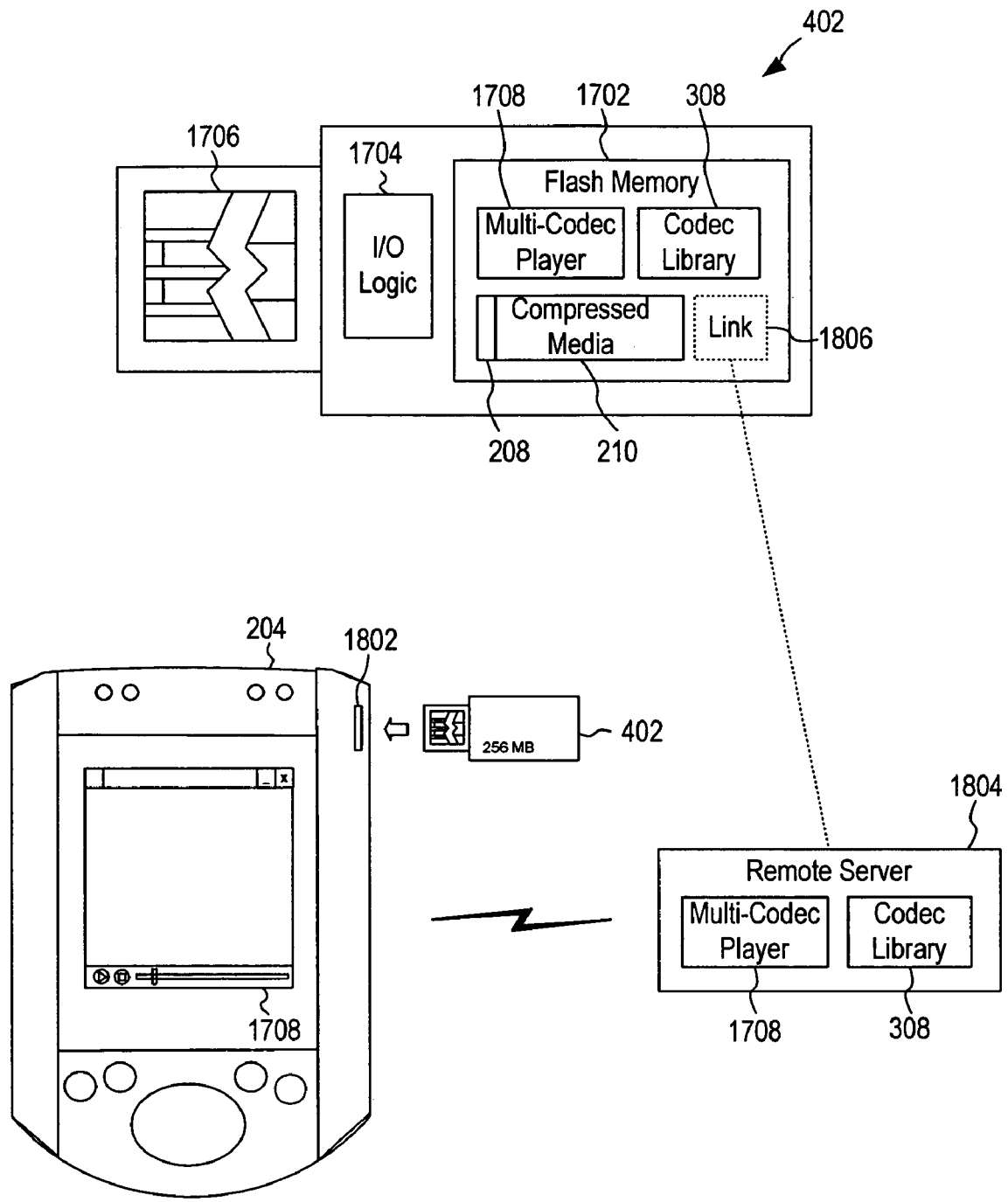
FIG. 18 is a block diagram a multimedia distribution device, a destination device, and a remote server.

FIG. 18 illustrates the use of a multimedia distribution device 402 to deliver the compressed media signal 210 to a destination system 204, such as a personal digital assistant (PDA). Of course, the destination device 204 may be any multimedia system, e.g., personal computer (PC), interactive television (iTV) system, etc., that provides an appropriate interface 1802 for receiving the multimedia distribution device 402, e.g., a USB slot.

When the multimedia distribution device 402 is installed into the interface 1802, the multi-codec player 1708 and codec library 308 may be automatically or manually installed on the destination system 204. Alternatively, the multi-codec player 1708 may execute directly from the multimedia distribution device 402, with the codec library 308 being accessed from the multimedia distribution device 402 as needed.

In still other embodiments, the multi-codec player 1708 and/or codec library 308 may be stored on a remote server 1804 and downloaded to the destination system 204 upon demand. In such an embodiment, the flash memory 1702 may store a link 1806, such as a URL (uniform resource locator), that provides access to various resources, including the player 1708 and/or library 308, not stored within the flash memory 1702. These resources may be accessed by the destination system 204 using any conventional means, such as a wireless network or the like.

Figure 19:
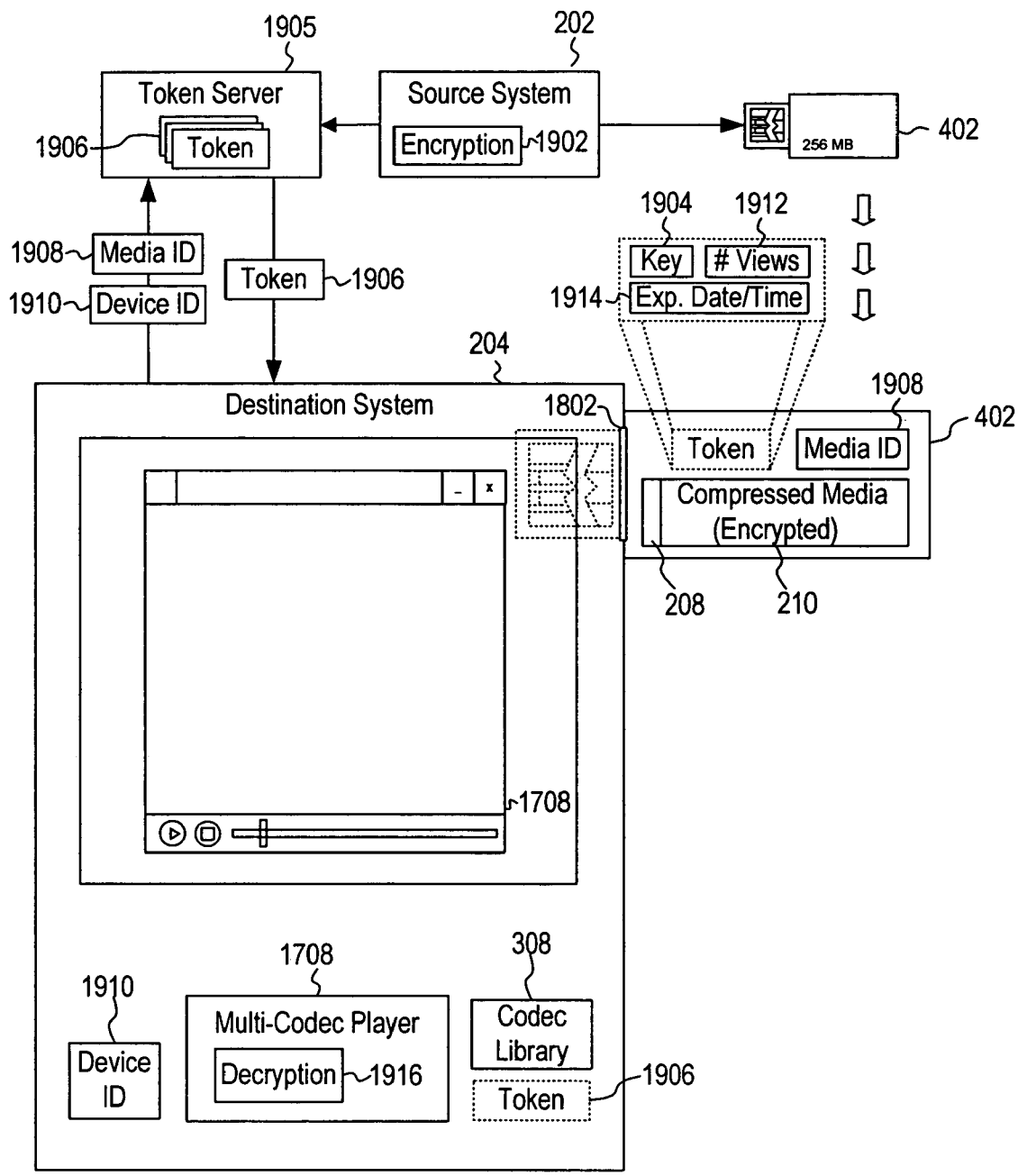
FIG. 19 is a block diagram of a system for securely distributing multimedia content to a destination device.

FIG. 19 illustrates a technique for securely distributing compressed media signals 210 to a destination system 204 using a multimedia distribution device 402. In one embodiment, an encryption module 1902 within the source system 202 encrypts the compressed media signal 210 using a standard encryption algorithm, such as RC4, DES (Data Encryption Standard), triple-DES, AES (Advanced Encryption Standard), or the like. While the foregoing encryption methods are symmetric key algorithms, embodiments could be adapted to asymmetric or "public" key algorithms as well.

In an alternative embodiment, only the codec indicators 208 are encrypted, which instruct the multi-codec player 1708 as to which codecs from the codec library 308 are to be used for decoding each scene within the compressed media signal 210.

In one implementation, each compressed media signal 210, e.g., a movie or television show, is encrypted using a particular key 1904. The key 1904 may vary in length depending on the particular encryption algorithm being used. For example, the key length for the triple-DES cipher is 168 bits.

A token 1906 containing, among other things, the key 1904, may be stored within the source system 202 or, alternatively, sent to a token server 1905 for storage as depicted in FIG. 19. The source system 202 stores the compressed media signal 210 (including the codec indicators 208) on the multimedia distribution device 402. In addition, the source system 202 stores a media ID 1908, such as a serial number or other identifier, on the multimedia distribution device 402 to identify the compressed media signal 210.

As illustrated, the multimedia distribution device 402 may be inserted into interface 1802 of the destination system 204. As previously explained, the multi-codec player 1708 and/or codec library 308 may be installed (or may have already been installed) on the destination system 204.

In one configuration, the destination system 204 include a device ID 1910, which may be accessed (read) but not modified. For instance, the device ID 1910 may be imbedded in a read-only memory (ROM) or hardwired into the destination system 204 in other ways.

When a user desires to view the encrypted and compressed media signal 210 for the first time, the destination system 204, in one embodiment, provides the media ID 1908 (read from the multimedia distribution device 402) and the device ID 1910 to the token server 1905 via the Internet or another network. The destination system 204 may also send payment or user ID information (not shown), which are verified to authorize the playing of the compressed media signal 210. Alternatively, the device ID 1910 may be pre-associated with an account, such as a user's credit card account, or included within a list of authorized destination systems 402 to receive a token 1906.

Assuming that the destination system 204 is authorized to play the compressed media signal 210, the token server 1905 sends the particular token 1906 containing the key 1904 that is necessary to decrypt the compressed media signal 210. In one configuration, the token 1906 may include use restrictions, such as a set number of viewings 1912 and/or an expiration date and/or time 1914.

After verifying that the use restrictions (if any) are satisfied, i.e., a positive number of viewings 1912 are remaining and/or the expiration date and/or time 1914 has not expired, a decryption module 1916 within the multi-codec player 1708 uses the key 1904 from the token 1906 to decrypt the compressed media signal 210 (and/or codec indicators 208). The compressed media signal 210 may then be decoded and displayed using the codec library 308 as discussed with reference to FIGS. 2-3.

In one embodiment, the token 1906 is stored within the multimedia distribution device 402 so that it will not be necessary to reacquire the token 1906 from the token server 1905 in order to view the compressed media signal 210. Accordingly, the destination system 204 need not always be "online." Additionally, the destination system 204 may decrement the number of remaining viewings 1912 in the token 1906 (as necessary) with each viewing in accordance with the use restrictions for the compressed media signal 210.

In certain configurations, the destination system 204 may store an indication of the device ID 1910 on the multimedia distribution device 402 to prevent the compressed media signal 210 from subsequently being used (shared) on another destination system 204. In addition, the token 1906 may, itself, be encrypted based, for instance, on the device ID 1910 to prevent subsequent access to the token 1906 by an unauthorized destination system 204.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A multimedia distribution device comprising:
a nonvolatile memory storing:
a compressed media signal comprising plurality of scenes each comprising a number of temporally adjacent frames in which at least two scenes are selectively compressed using at least two different codecs from a codec library, wherein the at least two different codecs are automatically selected by repeating, for each of the plurality of scenes, the steps of:
testing a plurality of different codecs on the scene to determine how each codec encodes the scene in terms of quality and compression level; and
automatically selecting the codec that produces the highest quality encoded output for the scene according to a set of criteria without exceeding a bandwidth constraint; and
a plurality of codec indicators specifying which codecs from the codec library were used to respectively compress each scene within the compressed media signal.

2. The multimedia distribution device of claim 1, wherein the nonvolatile memory further stores the codec library.

3. The multimedia distribution device of claim 1, wherein the nonvolatile memory further stores a multi-codec player to selectively decode each scene within the compressed media signal using a particular codec from the codec library specified by a codec indicator.

4. The multimedia distribution device of claim 1, wherein the nonvolatile memory includes a link to a multi-codec player on a remote server, wherein the multi-codec player is to selectively decode each scene within the compressed media signal using a particular codec from the codec library specified by a codec indicator.

5. The multimedia distribution device of claim 4, wherein the link comprises a uniform resource locator (URL).

6. The multimedia distribution device of claim 1, wherein the nonvolatile memory further stores a link to the codec library on a remote server.

7. The multimedia distribution device of claim 1, wherein the codecs in the codec library are selected from the group consisting of discrete cosine transform (DCT) codecs, fractal codecs, and wavelet codecs.

8. The multimedia distribution device of claim 1, wherein at least one codec is selected by an artificial intelligence (AI) system based on a plurality of characteristics of a scene.

9. The multimedia distribution device of claim 1, wherein at least one codec is selected by testing at least a subset of the codecs of the codec library on a scene and automatically selecting the codec that produces a highest compression quality for the scene according to a set of criteria without exceeding the target data rate.

10. The multimedia distribution device of claim 1, wherein the nonvolatile memory further stores media identifier that, when presented with authentication data to a token server, results in a transmission of a token comprising a key for decrypting the compressed media signal.

11. A method for distributing multimedia content comprising:
- obtaining a media signal comprising a plurality of scenes, each scene comprising a number of temporally adjacent frames;
- repeating for each of the plurality of scenes:
  - testing a plurality of different codecs from a codec library on the scene to determine how each codec encodes the scene in terms of quality and compression level;
  - automatically selecting the codec that produces the highest quality encoded output for the scene according to a set of criteria without exceeding a bandwidth constraint;
  - storing the scene encoded using the selected codec in a nonvolatile memory with a codec indicator specifying which codec from the codec library was used to compress the scene, wherein at least two scenes are encoded using different codecs from the codec library.

12. The method of claim 11, further comprising:
storing the codec library within the nonvolatile memory.

13. The method of claim 11, further comprising:
storing a multi-codec player within the nonvolatile memory, wherein the multi-codec player is to selectively decode each scene within the compressed media signal using a particular codec from the codec library specified by a codec indicator.

14. The method of claim 11, further comprising:
storing within the nonvolatile memory a link to a multi-codec player on a remote server, wherein the multi-codec player is to selectively decode each scene within the compressed media signal using a particular codec from the codec library specified by a codec indicator.

15. The method of claim 14, wherein the link comprises a uniform resource locator (URL).

16. The method of claim 11, further comprising:
storing within the nonvolatile memory a link to the codec library on a remote server.

17. The method of claim 11, wherein the codecs in the codec library are selected from the group consisting of discrete cosine transform (DCT) codecs, fractal codecs, and wavelet codecs.

18. The method of claim 11, wherein at least one codec is selected by an artificial intelligence (AI) system based on a plurality of characteristics of a scene.

19. The method of claim 11, wherein at least one codec is selected by testing at least a subset of the codecs of the codec library on a scene and automatically selecting the codec that produces a highest compression quality for the scene according to a set of criteria without exceeding the target data rate.

20. The method of claim 19, further comprising:
storing within the nonvolatile memory a media identifier that, when presented with authentication data to a token server, results in a transmission of a token comprising a key for decrypting the compressed media signal.

* * * * *